(12) United States Patent
Hou et al.

(10) Patent No.: US 11,467,311 B2
(45) Date of Patent: Oct. 11, 2022

(54) 3D INVERSION OF DEEP RESISTIVITY MEASUREMENTS WITH CONSTRAINED NONLINEAR TRANSFORMATIONS

(71) Applicant: Halliburton Energy Services, Inc., Houston, TX (US)

(72) Inventors: Junsheng Hou, Kingwood, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 522 days.

(21) Appl. No.: 16/610,070

(22) PCT Filed: Feb. 21, 2019

(86) PCT No.: PCT/US2019/018872
§ 371 (c)(1),
(2) Date: Oct. 31, 2019

(87) PCT Pub. No.: WO2020/171812
PCT Pub. Date: Aug. 27, 2020

(65) Prior Publication Data
US 2021/0333429 A1    Oct. 28, 2021

(51) Int. Cl.
*G06T 17/20* (2006.01)
*G01V 3/38* (2006.01)
(Continued)

(52) U.S. Cl.
CPC ............... *G01V 3/38* (2013.01); *E21B 44/00* (2013.01); *E21B 49/00* (2013.01); *G01V 99/005* (2013.01);
(Continued)

(58) Field of Classification Search
None
See application file for complete search history.

(56) References Cited

U.S. PATENT DOCUMENTS

| | | |
|---|---|---|
| 2009/0119076 A1 | 5/2009 | Madatov et al. |
| 2016/0040531 A1 | 2/2016 | Ramakrishnan et al. |
| 2016/0266269 A1 | 9/2016 | Wilson et al. |

FOREIGN PATENT DOCUMENTS

| | | |
|---|---|---|
| WO | 2009039533 A2 | 3/2009 |
| WO | 2018160279 A1 | 9/2018 |

OTHER PUBLICATIONS

Dupuis et al., Automatic inversion of deep-directional-resistivity measurements for well placement and reservoir description, May 31, 2015, 504-512 (Year: 2016).*

(Continued)

*Primary Examiner* — Robert J Craddock
(74) *Attorney, Agent, or Firm* — Delizio, Peacock, Lewin & Guerra

(57) ABSTRACT

A method includes setting a value of a formation parameter for a subsurface formation and creating an initial three-dimensional (3D) model of the subsurface formation based on the formation parameter. The method also includes applying a constrained transformation to one or more inversion variables of the initial 3D model to create a variable-constrained 3D model of the subsurface formation and applying an unconstrained minimization operation to the variable-constrained 3D model to generate a first transformed 3D model. The method also includes inverting the first transformed 3D model to generate a first inverted 3D model of the subsurface formation.

20 Claims, 14 Drawing Sheets

(51) Int. Cl.
  *E21B 44/00* (2006.01)
  *E21B 49/00* (2006.01)
  *G01V 99/00* (2009.01)
  *G06T 19/20* (2011.01)
(52) U.S. Cl.
  CPC .............. *G06T 17/20* (2013.01); *G06T 19/20* (2013.01); *E21B 2200/20* (2020.05); *G06T 2219/2016* (2013.01)

(56) References Cited

OTHER PUBLICATIONS

Dupuis, et al., "Automatic inversion of deep-directional-resistivity measurements for well placement and reservoir description", The Leading Edge, 34, 2015, 7 pages.
Puzyrev, et al., "Interpretation of deep directional resistivity measurements acquired in high-angle and horizontal wells using 3-D inversion", Geophysical Journal International, Feb. 5, 2018, 11 pages.
Sviridov, et al., "New Software for Processing of LWD Extradeep Resistivity and Azimuthal Resistivity Data", SPE Reservoir Evaluation and Engineering, 17 (2), 109-127.
Wu, et al., "A New Ultra-Deep Azimuthal Electromagnetic LWD Sensor for Reservoir Insight", SPWLA 59th Annual Logging Symposium, Jun. 2-6, 2018, 14 pages.
Yang, et al., "3D electromagnetic inversion of logging while drilling data", 87th Annual International Meeting, SEG, Expanded Abstracts, 890-894.
PCT Application Serial No. PCT/US2019/018872, International Search Report, dated Nov. 18, 2019, 3 pages.
PCT Application Serial No. PCT/US2019/018872, International Written Opinion, dated Nov. 18, 2019, 5 pages.

\* cited by examiner

3D INVERSION OF DEEP RESISTIVITY MEASUREMENTS WITH CONSTRAINED NONLINEAR TRANSFORMATIONS

BACKGROUND

The disclosure generally relates to the field of underground formation evaluation and, in particular, to using formation resistivity measurements to determine petrophysical formation properties.

Resistivity measurements and other sensor measurements are used to determine the formation parameters of rock formations surrounding a borehole. This information can be used to generate three-dimensional (3D) models of the subsurface formation. More accurate characterizations of a subsurface formation can include formation parameters such as horizontal resistivity, vertical resistivity, and anisotropy and increase the complexity of generating an accurate 3D formation model. Such 3D models are useful for a variety of purposes before, during, and after a well operation.

BRIEF DESCRIPTION OF THE DRAWINGS

Embodiments of the disclosure may be better understood by referencing the accompanying drawings.

DESCRIPTION OF EMBODIMENTS

Figure 1:
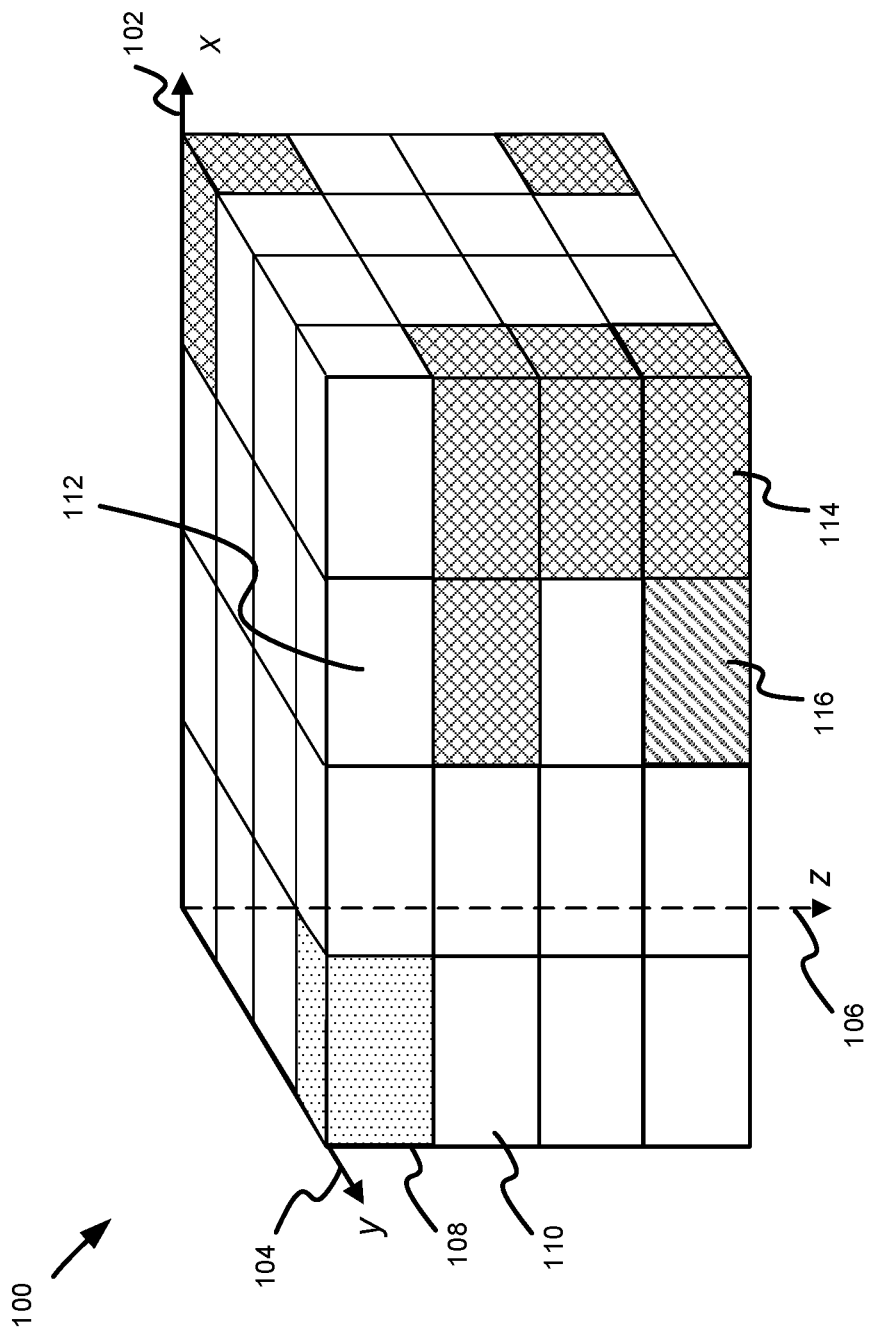
FIG. 1 is a gridded three-dimensional (3D) model of a well system.

The description that follows includes example systems, methods, techniques, and operations that embody aspects of the disclosure. However, it is understood that this disclosure may be practiced without these specific details. For instance, this disclosure refers to resistivity as a formation parameter. Aspects of this disclosure can also be applied to other formation parameters such as conductivity, density, heat conductivity, permeability, porosity, etc. In other instances, well-known structures and techniques have not been shown in detail in order not to obfuscate the description.

Various embodiments include a set of operations and related systems to generate a 3D model of subsurface formation and determine formation parameters using the 3D model of the subsurface formation. A system that includes a processor can generate a 3D model of the subsurface formation by applying a nonlinear minimization operation. In some embodiments, the system can determine or otherwise set a value(s) for one or more initial formation parameters, apply a nonlinear minimization operation to generate a 3D model based on the initial formation parameters, and invert the 3D model into an inverted 3D model useful for determine resulting formation parameters. In some embodiments, the system can use an unconstrained minimization operation, wherein an unconstrained minimization operation does not apply an explicit constraint on at least one formation parameter during the nonlinear minimization operation.

After creating an initial 3D model of a subsurface formation based on the value of a first formation parameter, the system can apply a constrained transformation to one or more inversion variables of the initial 3D model, wherein an inversion variable can be a formation parameter or can be calculated from the first formation parameter. For example, an inversion variable can be a formation resistivity, anisotropy, formation dip, formation azimuth, 3D model boundary, etc. The system can apply the constrained transformations to one or more inversion variables of a 3D model to generate a variable-constrained 3D model of the subsurface formation in order to constrain the set of possible solutions when using an unconstrained minimization operation. The system can then apply an unconstrained minimization operation to the variable-constrained 3D model to generate a transformed 3D model. The system can use the transformed 3D model by inverting the model to generate an inverted 3D model of the subsurface formation.

In some embodiments, the initial 3D model can be determined based on a lower-dimensional model such as a one-dimensional (1D) model or two-dimensional (2D) model. For example, the system can first generate a 1D model of the subsurface based on an initial set of resistivity measurements and use the 1D model to generate an initial 3D model. In some embodiments, the system can generate more than one lower-dimensional model. For example, the system can generate a 1D model and a 2D model based on the value(s) of a formation parameter and use the set of lower-dimensional models to generate a set of initial 3D models. The system can then apply one or more constrained transformations and an unconstrained minimization operation to generate a first transformed 3D model and a second transformed 3D model.

In some embodiments, the system can invert each of the transformed 3D models and compare the results with each other to generate a quality indicator correlated with the precision and/or accuracy of the resulting formation parameters. In some embodiments, a quality indicator can be assigned to each pixel of a 3D structure and determined based on standard deviation (SD), relative error (RE), misfit log, 5% confidence, 50% confidence, 95% confidence, etc. In some embodiments, the use of different minimization operations can provide different 3D quality indicators. For example, the system can use an unconstrained minimization operation that includes the use of a Jacobian matrix and a Gauss-Newton algorithm to produce a first quality indicator corresponding with a first 3D model and use a 3D forward model to produce second 3D quality indicator model. A 3D quality indicator can provide users with an additional information useful for performing well operations and/or drilling operations.

The operations described in this application can provide an inverted 3D formation model having greater accuracy. In addition, the ability to use an unconstrained minimization operation to generate constrained solutions increases the robustness and versatility of the operations for generating an inverted 3D formation model to various data types across a variety of numeric ranges. This inverted 3D formation can then be used for various other operations, such as changing a drilling direction in response to the detection of a target formation parameter determined using the operations disclosed below.

Example 3D Model

FIG. 1 is a gridded three-dimensional (3D) model of a well system The 3D model 100 of a well system can include multiple pixels (sometimes also called "gridblocks," "elements," "cells," etc.), wherein each pixel represents a discrete space having the same formation parameters within the discrete space. The 3D model 100 can be based on cartesian coordinates, wherein each pixel is shown having a position along an x-axis 102, y-axis 104, and z-axis 106. In some embodiments, the pixels can have different sizes or shapes from each other. In addition, the 3D model can be based on different coordinate systems such as a cylindrical coordinate system. The 3D model 100 can include a resistivity/conductivity distribution. The resistivity distribution can be described as being distributed in at least one of a zero-dimensional (0D), 1D, 2D, and/or 3D space. The distribution functions can be described in various coordinate systems.

The 3D model 100 includes a first pixel 108 can correspond with "limestone" as a material and have a corresponding first set formation properties different from any of the other pixels. The 3D model 100 can also include a second pixel 110 and third pixel 112, wherein both pixels can correspond with a same material such as "shale." In some embodiments, the second pixel 110 and third pixel 112 can share a set of formation properties. Alternatively, the second pixel and third pixel 112 can have different formation properties. For example, the second pixel 110 can have a resistivity of 6.0 ohm-meter (ohm-m) while the third pixel can have a resistivity of 0.8 ohm-m due to different water saturation values between the two pixels. The 3D model 100 can also include the fourth pixel 114 and fifth pixel 116, each of which can also have their own formation parameters or share a subset of formation parameters with another pixel. For example, the fourth pixel 114 and fifth pixel 116 can share a same vertical resistivity value but have different horizontal resistivity values.

Example Flowchart

The flowchart below is provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 208-240 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Figure 2:
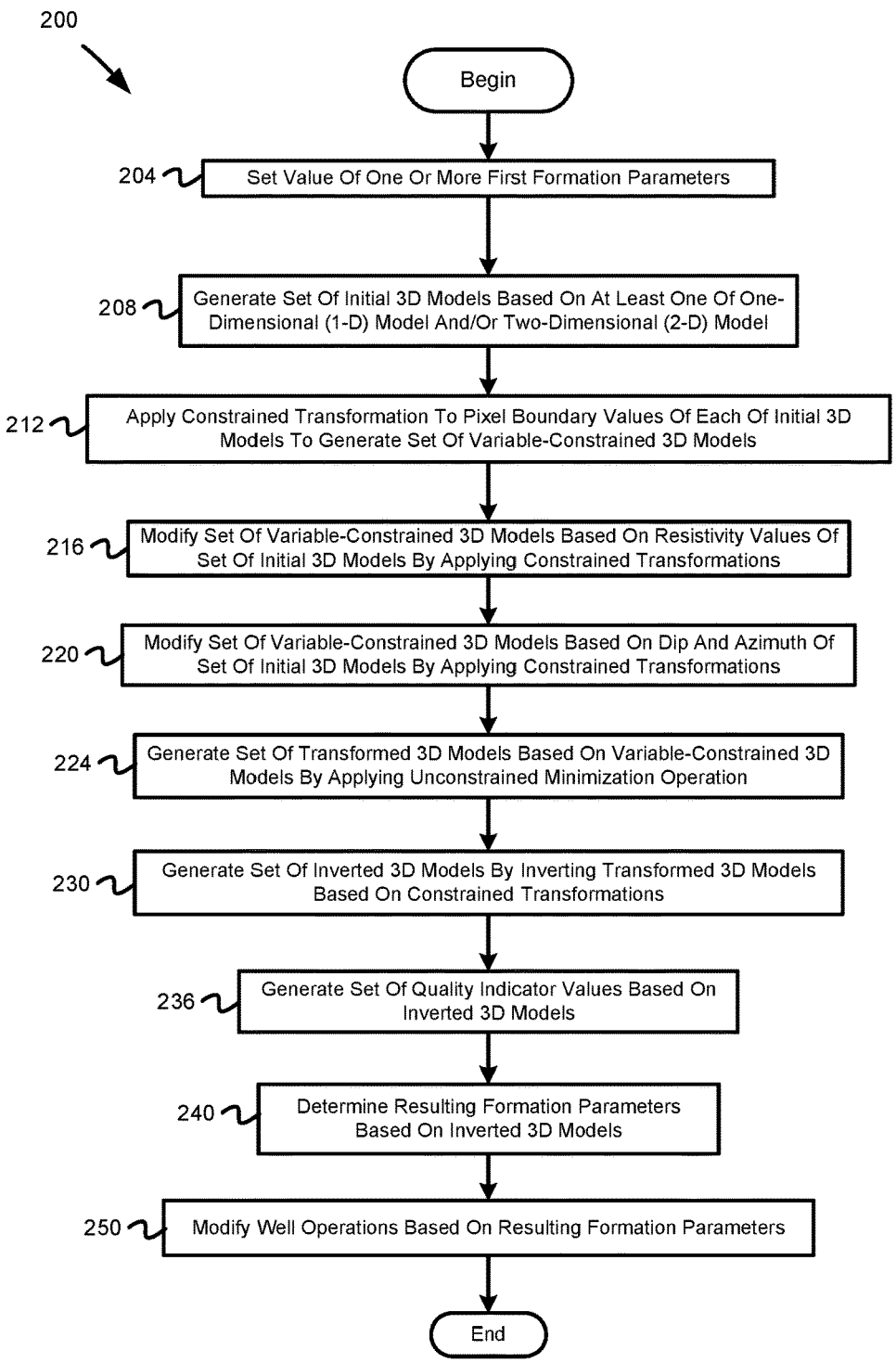
FIG. 2 is a flowchart of operations to generate an inverted 3D model of a subsurface formation.

FIG. 2 is a flowchart of operations to generate an inverted 3D model of a subsurface formation. The operations of the flowchart 200 are described with reference to a system that includes a processor. The processor may execute the operations in the flowchart 200 to cause the system to generate an inverted 3D model. Operations of the flowchart 200 begin at block 204.

At block 204, the system sets the values of one or more first formation parameters. The system can acquire values based previously determined values from a reference table. Alternatively, or in addition, the system can acquire measurements from one or more of sensors in the wellbore of a formation or at the surface of a formation. For example, with reference to FIG. 12 below, measurements can be obtained from a sensor in the sensor tool 1210 and used to set the values of one or more first formation parameters. These acquired values can then be used to set the one or more first formation parameters such as resistivity.

At block 208, the system generates a set of initial 3D models based on at least one 1D model and/or at least one 2D model. The system can generate the 1D or 2D model based on a generalized 3D formation model, wherein the generalized 3D formation model can be a formation conductivity model. The formation conductivity model can be a 3D model having dimensions of $(N_x \times N_y \times N_z)$, wherein $N_x$ is the total number of pixels along the x-axis direction, $N_y$ is the total number of pixels along the y-axis direction, and $N_z$ is the total number of pixels along the z-axis direction. Every coordinate point consisting of integers in the formation model can represents a pixel. The conductivity of the formation model can be determined using Equation 1 below, wherein $\sigma_{ijk}$ is the conductivity of the formation represented by the coordinate at point i, j, and k, and wherein and $\Pi_{ijk}$ is a 3D boxcar function:

$$\sigma(x,y,z) \approx \sum_{i=1}^{N_x} \sum_{j=1}^{N_y} \sum_{k=1}^{N_z} [\sigma_{ijk} \cdot \Pi_{ijk}] \quad (1)$$

The 3D boxcar function can be determined based on three 1D boxcar functions. In some embodiments, each of the boxcar boundary limits can be infinite. For example, Equation 2 can have the following boundary limits: $xB_1=-\infty$; $xB_{N_x+1}=+\infty$; $yB_1=-\infty$, $yB_{N_y+1}=+\infty$; and $zB_1=-\infty$, $zB_{N_z+1}=+\infty$, wherein $\Pi_i(x, xB_i, xB_{i+1})$ is the 1D boxcar function along the x direction, $\Pi_j(y, yB_j, yB_{j+1})$ is the 1D boxcar function along the y direction, and $\Pi_k(z, zB_k, zB_{k+1})$ is the 1D boxcar function along the z direction, wherein $xB_i$ represents a boundary condition limit(s) in the x-direction for the pixels wherein the x index value is equal to i, $yB_j$ represents a boundary condition(s) in the y-direction for pixels wherein the y index value is equal to j, and $zB_k$ represents a boundary condition(s) in the z-direction for pixels wherein the z index value is equal to k, respectively:

$$\Pi_{ijk}(x,y,z;xB_i,xB_{i+1};yB_j,yB_{j+1};zB_k,zB_{k+1}) = \Pi_i(x,xB_i,xB_{i+1}) \cdot \Pi_j(y,yB_j,yB_{j+1}) \cdot \Pi_k(z,zB_k,zB_{k+1}) \quad (2)$$

In some embodiments, the formation can be anisotropic. For example, the conductivities can be written as two 3×3 diagonal tensors for a transversely isotropic (TI) anisotropic formation. The anisotropic quality of a formation can be modeled with additional parameters such as an anisotropic ratio of the formation conductivity for one or more of the pixels. The anisotropic ratio of the formation conductivities can be determined using two diagonal tensors, σ(x, y, z) and $\sigma_{ijk}$, that describe the TI anisotropic formation, represented below in Equations 3-5, wherein $\sigma_h$ is horizontal conductivity, $\sigma_v$ is vertical conductivity, $\sigma_h^{ijk}$ is a horizontal conductivity of a pixel at (i, j, k), and $\sigma_v^{ijk}$ is a vertical conductivity of a pixel at (i, j, k):

$$\sigma(x,y,z) = \text{diag}(\sigma_h(x,y,z), \sigma_h(x,y,z), \sigma_v(x,Y,z)) \quad (3)$$

$$\sigma_{ijk} = \text{diag}(\sigma_h^{ijk}, \sigma_h^{ijk}, \sigma_v^{ijk}) \quad (4)$$

In some embodiments, a conductivity anisotropic ratio $\sigma_{hv}^{ijk}$ of a pixel at (i, j, k) for its corresponding formation conductivity can be defined by Equation 5 below:

$$\sigma_{hv}^{ijk} = \frac{\sigma_h^{ijk}}{\sigma_v^{ijk}} \quad (5)$$

Furthermore, in some embodiments, a resistivity anisotropy can be used to determine formation properties such as a formation dip and azimuth angles (α & β). Because conductivity is the inverse of resistivity, the anisotropic ratio of the formation resistivity of each pixel (i, j, k) can also be described as shown in Equations 6 and 7, wherein $R_{ijk}$ is the resistivity corresponding to the pixel at (i, j, k), $R_h^{ijk}$ is the horizontal resistivity component at (i,j,k), $R_v^{(ijk)}$ is the vertical resistivity component at (i,j,k), and $R_{vh}^{(ijk)}$ is the anisotropic ratio of resistivity of the pixel at (i, j, k):

$$R_{ijk} = \text{diag}(R_h^{(ijk)}, R_h^{(ijk)}, R_v^{(ijk)}) \quad (6)$$

$$R_{vh}^{(ijk)} = \sigma_{hv}^{ijk} = \frac{\sigma_h^{ijk}}{\sigma_v^{ijk}} = \frac{R_v^{(ijk)}}{R_h^{(ijk)}} \quad (7)$$

In some embodiments, the formation parameters can be expressed as a column vector $\overline{X}$ (or 1-column matrix) as shown in Equation 8 with total of $N_{p3}$ parameters, wherein $N_{p3}$ is defined below for Equation 9, wherein $R_h^m$ is the horizontal resistivity component at the m-th pixel, $R_v^m$ is the vertical resistivity component at the m-th pixel, and $xB_j$ is the boundary condition limit(s) in the x-direction for the pixels wherein the x index value is equal to j:

$$\overline{X} = (R_h^{(1)}, \ldots, R_h^{(N_xN_yN_z)}, \ldots, R_v^{(N_xN_yN_z)}, xB_2, xB_{N_x}, yB_2, yB_{N_y}, zB_2, zB_{N_z}, \alpha, \beta)^T \quad (8)$$

$$N_{p3} = [2N_xN_yN_z + N_x + N_y + N_z - 1] \quad (9)$$

Equation 8 can be re-written by replacing the vertical resistivities of pixels with their corresponding anisotropic ratios to produce Equation 10 and its simplified form Equation 11, wherein $R_h$ is the set of horizontal resistivity values $[R_h^{(1)}, \ldots, R_h^{(N_xN_yN_z)}]$ and $R_{vh}$ is a set of resistivity anisotropy values $[R_{vh}^{(1)}, \ldots, R_{vh}^{(N_xN_yN_z)}]$, xB is a set of the boundary condition limits $[xB_2, \ldots, xB_{N_x}]$, yB is a set of the boundary condition limits $[yB_2, \ldots, yB_{N_y}]$, zB is a set of the boundary condition limits $[zB_2, \ldots, zB_{N_z}]$:

$$\overline{X} = (R_h^{(1)}, \ldots, R_h^{(N_xN_yN_z)}, R_{vh}^{(1)}, \ldots, R_{vh}^{(N_xN_yN_z)}, xB_2, \ldots, xB_{N_x}, yB_2, \ldots, yB_{N_y}, zB_2, \ldots, zB_{N_z}, \alpha, \beta)^T \quad (10)$$

$$\overline{X} = (R_h, R_{vh}, xB, yB, zB, \alpha, \beta)^T \quad (11)$$

The 3D pixel-based model, as represented by Equations 1-11 above, can be used to generate a 1D model approximation and/or a 2D model approximation. In some embodiments, the 2D pixel-based model can be generated by setting the constraints to the following: $N_y=1$, $N_x>1$, $N_z>1$. For example, applying these constraints to Equation 1 yields Equation 12, which represents a 2D pixel-based model approximation for the formation:

$$\sigma(x, y, z) \approx \sum_{i=1}^{N_x} \sum_{k=1}^{N_z} \left[ \sigma_{ijk} \cdot \prod_{ijk} \right] \quad (12)$$

The parameter vector can correspondingly be reduced to Equations 13 and/or 14, wherein $R_h^{(1)}$ is the horizontal resistivity for the first pixel in the 2D model, $R_h^{(N_xN_z)}$ is the horizontal resistivity for the $N_xN_z$-th pixel in the 2D model, $R_{vh}^{(1)}$ is the resistivity anisotropy for the first pixel in the 2D model, $R_{vh}^{(1)}$ is the resistivity anisotropy for the $N_xN_z$-th pixel in the 2D model $N_x$ is the maximum number of pixels in the x-direction, $N_z$ is the maximum number of pixels in the z-direction, $xB_{N_x}$ is a boundary condition limit in the x-direction for pixel(s) at the index value $x=N_x$, and $zB_{N_z}$ is a boundary condition limit in the z-th direction for pixel(s) at the index value z=Nz:

$$\overline{X} = (R_h^{(1)}, R_h^{(N_xN_z)}, R_{vh}^{(1)}, R_{vh}^{(N_xN_z)}, xB_2, xB_{N_x}, zB_2, zB_{N_z}, \alpha, \beta)^T \quad (13)$$

$$\overline{X} = (R_h, R_{vh}, xB, zB, \alpha, \beta)^T \quad (14)$$

Equations 12-14 can then be used to generate a 2D conductivity approximation and its corresponding parameter vector. The 2D pixel conductivity approximation, $\sigma_{ik}$, can expressed as function $f_{ik}^{(2D)}$ of the boundary condition limit $yB_j$ and the conductivity $\sigma_{ijk}$ as shown below in Equation 15, wherein the 2D model approximation can have the same parameters with the 3D model as shown above and $N_y$ is the maximum number of pixels in the y-direction:

$$\sigma_{ik} = f_{ik}^{(2D)}(yB_j, \sigma_{ijk}), j=1,2, \ldots, N_y), j=1,2, \ldots, N_y \quad (15)$$

In addition, the 3D pixel-based model as represented by Equations 1-11 above can be used to generate a 1D model approximation, which can sometimes be referred to as a 1D multi-layer formation model. In some embodiments, the 1D pixel-based model can be generated by setting the constraints to the following: $N_y=1$, $N_x=1$, and $N_z>1$. For example, applying these constraints to Equation 1 can yield Equation 16, which represents a 1D pixel-based model approximation for the formation conductivity α(z):

$$\sigma(z) \approx \sum_{i=1}^{N_x} [\sigma_k \cdot \prod_k] \quad (16)$$

The parameter vector $\overline{X}$ for a 1D model can correspondingly be reduced to Equations 17 and/or 18, wherein $R_h^{(k)}$ is the horizontal resistivity for the k-th pixel in the 1D model, $R_{vh}^{(k)}$ is the resistivity anisotropy for the k-th pixel in the 1D model:

$$\overline{X} = (R_h^{(1)}, R_h^{(k)}, R_h^{(NZ)}, R_{vh}^{(1)} \ldots, R_{vh}^{(k)}, R_{vh}^{(NZ)}, zB_2, zB_{N_z}, \alpha, \beta)^T \quad (17)$$

$$\overline{X} = (R_h, R_{vh}, zB, \ldots, \alpha, \beta)^T \quad (18)$$

Equations 12-14 can then be used to generate a 1D conductivity approximation and its corresponding parameter vector. The 1D pixel conductivity approximation, $\sigma_k$, can expressed as function $f_k^{(1D)}$ of the boundary condition limits $xB_j$ and $yB_j$ and conductivity components $\sigma_{ijk}$ as shown below in Equation 19:

$$\sigma_k = f_k^{(1D)}(xB_i, yB_j, \sigma_{ijk}, i=1,2,,N_x, j=1,2,,N_y) \quad (19)$$

Using the 1D and 2D model represented by Equations 12-19, the system can generate one or more initial 3D models to form a set of initial 3D models. For example, the 1D model can be extended to fill out the volume of an initial 3D model. In some embodiments, the system can generate both a 1D model and a 2D model as lower-dimension models, and then generate a first initial 3D model based on the 1D model and generate a second initial 3D model based on the 2D model. In addition, or alternatively, the system can use other models such as a pre-run inversion model or an initial setting from user-defined input data to generate one or more additional initial 3D models. Alternatively, or in addition, multiple initial guesses for multiple models that satisfy the equality and inequality constraints on inversion variables described below for blocks 212-220 can be randomly or deterministically generated.

At block 212, the system applies a constrained transformation to the pixel boundary values of each of the initial 3D models to generate a set of variable-constrained 3D models. In some embodiments, the pixel boundary values can be transformed to be constrained within a particular pixel boundary value range. For example, each of the pixel boundary distances xb, yb, and zb can be constrained to vary from −1 to 1. In addition, parameters of the pixel boundary values can also be bound. For example, the bounds of a measurement depth can be based on Equation 20, wherein B can be any one of $x_B$, $y_B$, $z_B$, and wherein $B_{ref}$ is the corresponding coordinate at a reference point such as $x_{Bref}$, $y_{Bref}$ and $Z_{Bref}$ and wherein DOI is a tool's depth of investigation, wherein the tool was used to acquire measurement values that the initial 3D model were based on:

$$|B - B_{ref}| \leq DOI \quad (20)$$

In some embodiments, the system can transform the pixel boundary values using a constrained nonlinear transformation, wherein the constrained nonlinear transform can be represented by Equations 21 and 22 below, wherein $\overline{X}$ represents the set of variables $(x_1, \ldots, x_N)^T$ and can be similar or the identical to the variables described for Equation 11, and wherein each variable $x_i$ can represent a formation parameter such as resistivity, anisotropy, saturation, etc., and wherein X represents a set of transformation variables $(\widetilde{x_1}, \ldots, \widetilde{x_N})^T$, wherein each of the values x, can be an inversion variable:

$$\overline{X} = f(\widetilde{X} \ldots) \quad (21)$$

$$\widetilde{X} = (\widetilde{x_1}, \ldots, \widetilde{x_N})^T \quad (22)$$

In some embodiments, the constrained nonlinear transformation $f_i$ can be represented by Equation 23 below, wherein $x_i$ is one of the variables of $\overline{X}$, and wherein $a_i = x_i^{min}$, and wherein $b_i = (x_i^{max} - x_i^{min})$, and wherein $x_i^{min}$ is the minimum value amongst the inversion variables $x_i$, and wherein $x_i^{max}$ is the maximum value amongst the inversion variables $x_i$ and $0 \leq f_i(\widetilde{x_1}) \leq 1$:

$$x_i = f_i(\widetilde{x_i}, a_i, b_i) = a_i + b_i * f_i(\widetilde{x_i}) \quad (23)$$

For example, the nonlinear transformation represented by Equation 23 can be represented by (though not limited to) any one of Equations 24-26, wherein $x_l$ is one of the variables of $\overline{X}$, and wherein k is a constant:

$$f_i(x_l) = 0.5[\sin(k\widetilde{x_l}) + 1] \quad (24)$$

$$f_i(x_l) = \frac{a^{k\widetilde{x_l}}}{1 + a^{k\widetilde{x_l}}} \quad (25)$$

$$f_i(x_l) = \sin^2(k\widetilde{x_l}) \quad (26)$$

In some embodiments, the system can transform the pixel boundary values using a linear transformation. For a linear transformation of a variable, the system can use Equations 27 and 28 below, wherein X is the variable before the linear transformation, $X_{tr}$ is the variable after the linear transformation, and A and B are two coefficients:

$$X = X_{tr}A + B \quad (27)$$

$$X_{tr} = \frac{X - B}{A} \quad (28)$$

The system can apply the transformations modeled using Equations 27-28 above to determine an x-coordinate pixel boundary, a y-coordinate pixel boundary, and a z-coordinate pixel boundary. The boundaries can be represented by Equations 29-31 below, wherein xb is a x-coordinate pixel boundary, yb is a y-coordinate pixel boundary, zb a z-coordinate pixel boundary, $x_{ref}$ is an x-coordinate reference point, $y_{ref}$ is ay-coordinate reference point, $z_{ref}$ is a z-coordinate reference point:

$$xb = \frac{xB - x_{ref}}{DOI} \quad (29)$$

$$yb = \frac{yB - y_{ref}}{DOI} \quad (30)$$

$$zb = \frac{zB - z_{ref}}{DOI} \quad (31)$$

As will be described further below or block 230, the system can use the boundaries above to invert very deep resistivity (VDR) data from xb, yb, and zb to determine the boundary values in physical units, wherein VDR data can include measurements of formation parameters deeper than 5 meters into the formation from a sensor. In some embodiments, the system can then recover the pixel boundaries (xB, yB, zB) by using relationships based on re-arrangements of Equations 29-31. For example, the system can recover xB as shown in Equation 32 below, wherein xB a pixel boundary in meaningful physical units:

$$xB = xb * DOI + x_{ref} \quad (32)$$

At block 216, the system applies a constrained transformation to the resistivity values of each of the initial 3D models to modify the set of variable-constrained 3D models. The system can transform resistivity values by transforming horizontal resistivity values, vertical resistivity values, and/ or an anisotropic ratio(s) of resistivity values. In some embodiments, the resistivity values may be within one or more pre-determined ranges. For example, the horizontal and vertical resistivity can be within a range of 0.1 ohm-m to 1000 ohm-m. In some embodiments, the ranges can be changed after the transformation. For example, using the transformations represented by the equations below, vertical resistivity value(s) $R_v$ can be constrained to a range between −1 to 3 and the formation anisotropic ratio $R_{vh}$ can be constrained to a range between 0 to 2. the system can determine $\widetilde{R_h}$ using Equation 33 below, wherein $R_h$ is the corresponding inversion variable and $\widetilde{f_{Rh}}$ is a constrained nonlinear transformation function of $R_h$, the minimum resistivity value Rhmin, and the maximum resistivity value Rhmax:

$$\widetilde{R_h} = \widetilde{f_{Rh}}(R_h, Rh\min, Rh\max) \quad (33)$$

In the case where $\widetilde{f_{Rh}}$ is a log transformation, Equation 33 can be reduced to Equation 34 below:

$$\widetilde{R_h} = \log_a\left(\frac{R_h - Rh\min}{Rh\max - R_h}\right) \quad (34)$$

The VDR data can be used to determine $\widetilde{R_h}$ and then one or more horizontal resistivity values can be mapped back to formation resistivity values in physical units as described below for block 236. For example, the system can invert $\widetilde{R_h}$ to $R_h$ using the equation 35 below, wherein a is the constant shown in Equation 34:

$$R_h = Rh\min + (Rh\max - Rh\min)\left(\frac{a^{\widetilde{R_h}}}{1 + a^{\widetilde{R_h}}}\right) \quad (35)$$

In some embodiments, $\widetilde{f_{Rh}}$ can be a log transformation of only $R_h$, which results in Equations 36 and 37 below:

$$\widetilde{R_h} = \log_a(R_h) \quad (36)$$

$$R_h = a^{\widetilde{R_h}} \quad (37)$$

For example, $R_h$ can be equal to $10^{(\widetilde{R_h})}$ if the common logarithm is used and $R_h$ can be equal to $e^{(\widetilde{R_h})}$ if the natural logarithm is used.

The system can also apply a set of constrained transformations to a first resistivity value to determine the vertical resistivity value $R_v$. In some embodiments, the system can replace $R_v$ with the ratio $R_{vh}$, wherein $R_v/R_h=R_{vh}$. $R_{vh}$ can be constrained to a particular range. For example, $R_{vh}$ can be constrained to a range of values greater than or equal to 1 and less than or equal to 20. Alternatively, the formation anisotropic ratio $R_{vh}$ can be constrained to a range of values greater than or equal to 0 and less than or equal to 2. In some embodiments, the value for $R_{vh}$ can be transformed into the constraint-transformed ratio $\widetilde{R_{vh}}$ represented by Equation 38, wherein $\widetilde{f_{Rvh}}$ is a constrained nonlinear transformation function of $R_{vh}$, the minimum resistivity value Rvhmin, and the maximum resistivity value Rvhmax:

$$\widetilde{R_{vh}} = \widetilde{f_{Rvh}}(R_{vh}, Rvh\min, Rvh\max) \quad (38)$$

In some embodiments, $\widetilde{f_{Rvh}}$ can include a log transformation of $R_{vh}$, Rvhmin, and Rvhmax, reducing Equation 38 to Equation 39 and its corresponding function to revert $\widetilde{R_{vh}}$ back by to $R_{vh}$ in Equation 40 below:

$$\widetilde{R_{vh}} = \log_a\left(\frac{R_{vh} - Rvh\min}{Rvh\max - R_{vh}}\right) \quad (39)$$

$$R_{vh} = Rvh\min + (Rvh\max - Rvh\min)\frac{a^{\widetilde{R_{vh}}}}{2 + a^{\widetilde{R_{vh}}}} \quad (40)$$

In some embodiments, $\widetilde{f_{Rvh}}$ can be a log transformation of $R_{vh}$, wherein the various relationships between $\widetilde{R_{vh}}$, $R_{vh}$, and a can be represented below in Equations 41-43:

$$\widetilde{R_{vh}} = \log_a(R_{vh}) \quad (41)$$

$$R_{vh} = a^{(\widetilde{R_{vh}})} \quad (42)$$

$$R_v = a^{(\widetilde{R_{vh}})} * R_h \quad (43)$$

At block 220, the system applies a constrained transformation to the dip and azimuth of each of the initial 3D models to modify the set of variable-constrained 3D models. In some embodiments, the system can use at least one of a linear and nonlinear transformations to determine the dip and azimuth of a formation or a portion of a formation. Alternatively, or in addition, the system can use both a linear transformation and a nonlinear transformation to determine the dip and azimuth. In some embodiments, the dip and azimuth can be constrained to a range between −90 degrees and +90 degrees, while the azimuth can be constrained to be within a range between −180 degrees and +180 degrees. Alternatively, the dip and azimuth can be constrained to be within a range between 0 degrees and +180 degrees, while the azimuth can be constrained to be within a range between 0 degrees and +360 degrees. In some embodiments, the ranges of the formation dip and azimuth can be converted to radians. For example, the formation dip can be constrained to a range between $$-\frac{\pi}{2} \text{ and } +\frac{\pi}{2}.$$

The formation dip and azimuth can also be re-scaled and/or shifted. For example, the formation dip can be transformed to range between −1 and 1.

In some embodiments, the system can apply one or more constrained nonlinear transformation such as those represented by Equations 23-26 above. In some embodiments, the system can use a relationship represented by Equations 44-45 to apply one or more constrained linear transformation. For example, using Equation 28, the system can set B equal to 0 and A equal to $\alpha_{max}$ to result in a relationship represented by Equation 44 shown below. Alternatively, or in addition, the system can use Equation 28 and set B equal to 0 and A equal to $\beta_{max}$ to result in a relationship represented by Equation 45 shown below. Equations 44 and 45 can then be used to apply a linear transformation for determining a dip and azimuth:

$$\alpha' = \frac{\alpha}{\alpha_{max}} \quad (44)$$

$$\beta' = \frac{\beta}{\beta_{max}} \quad (45)$$

Using Equations 44-45 above, if both dip and azimuth are in degrees, the transformed dip $\alpha'$ and the transformed azimuth $\beta'$ can be represented by Equations 46-47 below:

$$\alpha' = \alpha\frac{\pi}{180} \quad (46)$$

$$\beta' = \beta\frac{\pi}{180} \quad (47)$$

At block 224, the system generates a set of transformed 3D models based on the variable-constrained 3D models by applying an unconstrained minimization operation. In some embodiments, after one or more inversion variables in a set of initial 3D model are transformed to generate a set of variable-constrained 3D models, the system can use nonlinear minimization operation to generate an inverted 3D model. The nonlinear minimization operation can be used to solve the problem represented by Equations 48-50 below, wherein equation 48 can be reduced to Equation 50, $O(\overline{X})$ is the cost function of $\overline{X}=(x_1,, x_N)^T$, $\overline{X}^*$ is a solution of a cost function minimization, and wherein the cost function and subsequent solution(s) may be subject to equality constraints and/or inequality constraints as shown in Equation 50, and wherein $\overline{X}_{min}$ and $\overline{X}_{max}$ are the lower and upper bounds of $\overline{X}$:

$$\begin{cases} \min O(\overline{X}) \\ s.t. \text{ constraints } (e.g., \text{ equality and inequality constraints} \end{cases} \quad (48)$$

$$\overline{X}^* = \text{ArgMin}\{O(\overline{X}); s.t. \text{ all constraints}\} \quad (49)$$

$$\begin{cases} \min O(\overline{X}) \\ s.t. \ \overline{X}_{min} \le \overline{X} \le \overline{X}_{max}, xB_i \le xB_{i+1}, yB_j \le yB_{j+1}, zB_k \le zB_{k+1} \end{cases} \quad (50)$$

The specific bounds pertinent to Equation 50 can be based on the physical parameter bounds in the well logging domain for hydrocarbon exploration. For example, as discussed for block 216, the horizontal resistivity value $R_h$ and the vertical resistivity value $R_v$, respectively, can each be within a range of being greater than or equal to 0.1 ohm-m and less than or equal to 1000 ohm-m. In some embodiments, the nonlinear minimization method can include a cost function calculation. The cost function $O(\overline{x})$ can be calculated using Equation 51, wherein the term $\phi(\overline{X})$ is a weighted residual square term and $\varphi_{reg}(\overline{X})$ is a regularization term:

$$O(\overline{X}) = \phi(\overline{X}) + \varphi_{reg}(\overline{X}) \quad (51)$$

In some embodiments, Equation 51 can be re-written as Equation 52 below. In Equation 52, $\overline{W}_d$ is a data weight diagonal matrix and is equal to diag($w_{d1}, \ldots, w_{dj}, w_{dM}$), $w_{dj}$ is an element of the data weight diagonal matrix, $\overline{W}_x$ is a model weight diagonal matrix and is equal to diag ($w_{x1}, \ldots, w_{xj}, w_{xN}$), and $\overline{X}_p$ is a prescribed model parameter vector and $\overline{X}_{ave}$ is defined by Equation 53. In addition, $\lambda1$ and $\lambda2$ can be regularization parameters that can serve as scalar values that provide solution resolution, smoothing, function stability, balancing minimization of data fitting error and regularization terms. In some embodiments, $\lambda2$ can be equal to zero to reduce the cost function without the bound penalty term. In addition, the normalized data misfit vector $\overline{e}(\overline{X})$ can be defined using Equation 54, wherein $e_j(\overline{X})$ is the misfit error for the j-th observed data:

$$O(\overline{X}) = \frac{1}{2}\left\{\left\|\overline{W}_d \cdot \overline{e}(\overline{X})\right\|^2 + \left[\lambda1 \cdot \left\|\overline{W}_x \cdot (\overline{X} - \overline{X}_p)\right\|^2 + \lambda2 \cdot \left\|\overline{W}_x \cdot (\overline{X} - \overline{X}_{ave})\right\|^2\right]\right\} \quad (52)$$

$$\overline{X}_{ave} = \frac{\overline{X}_{min} + \overline{X}_{max}}{2} \quad (53)$$

$$\overline{e}(\overline{X}) = (e_1(\overline{X}), , e_j(\overline{X}), , e_M(\overline{X}))^2 \quad (54)$$

In some embodiments, the weighted residual square term $\{\|\overline{W}_d \cdot \overline{e}(\overline{X})\|^2$ can be defined using Equation 55, wherein $d_j^{obs}$ is the j-th observed data, and wherein $d_j^{pre}$ is the j-th simulated data corresponding to the j-th observed data, and wherein $Nf^{(j)}$ is a weighted normalization function, and wherein $x_p$ is a prescribed value for x:

$$\left\|\overline{W}_d \cdot \overline{e}(\overline{X})\right\|^2 = \sum_{j=1}^{M}|w_{dj} * e_j(\overline{X})|^2 = \sum_{j=1}^{M}\left|w_{dj} * \frac{d_j^{obs} - d_j^{pre}}{Nf^{(j)}}\right|^2 \quad (55)$$

$$\left\|\overline{W}_x \cdot (\overline{X} - \overline{X}_p)\right\|^2 = \sum_{i=1}^{N}|w_{xi} * (X_i - x_{pi})|^2 \quad (56)$$

$$\left\|\overline{W}_x \cdot (\overline{X} - \overline{X}_{ave})\right\|^2 = \sum_{i=1}^{N}|w_{xi} * (x_i - x_{avei})|^2 \quad (57)$$

In some embodiments, the system can use a Gauss-Newton method to solve each of the plurality of 3D models. Applying the Gauss-Newton method can include obtaining $\overline{\Delta X_n}$, which is a step vector (i.e. direction vector) that corresponds with an iteration n of an application of the Gauss-Newton method. The system can use the step vector to update an inverted parameter vector as shown in Equation 58 for cases wherein the $\overline{X}_{min} \le \overline{X}_{n+1} \le \overline{X}_{max}$, wherein $\gamma_n$ is a step length, $\overline{X}_n$ is a parameter vector at time step n, and $\overline{X}_{n+1}$ is an unknown parameter vector corresponding to time step n+1:

$$\overline{X}_{n+1} = \overline{X}_n + \gamma_n \overline{\Delta X_n} \quad (58)$$

In some embodiments, the unknown parameter vector $\overline{X}_{n+1}$ can be updated using multiple nonlinear transformations. After applying multiple nonlinear transformations, the transformation result having the least misfit error can be selected as the transformation result corresponding with that particular iteration n. For example, multiple nonlinear transformations can be applied using as shown in Equation 59, wherein $f_l(\overline{X}_n, \gamma_n, \overline{\Delta X_n}, \overline{X}_{min}, \overline{X}_{max})$ is a nonlinear function having an index value l, wherein $\overline{X}_{min}$ and $\overline{X}_{max}$ are the lower and upper bounds of $\overline{X}$, respectively:

$$\overline{X_{n+1}^l} = f_l(\overline{X}_n, \gamma_n, \overline{\Delta X_n}, \overline{X}_{min}, \overline{X}_{max}), l = 1, 2, \ldots, L \quad (59)$$

In some embodiments, the system can generate a sensitivity matrix (i.e. Jacobian matrix) during a logging-while-drilling (LWD) electromagnetic (EM) inversion. In some embodiments, the system can determine the sensitivity matrix using at least one of a finite difference (FD) method, an Adjoint method, a FD+adjoint method, and a FD+adjoint+Broyden approximation. The system can use the sensitivity matrix to increase the efficiency and accuracy of a nonlinear minimization operation.

At block 230, the system generates a set of inverted 3D models by inverting the transformed 3D models based on the constrained transformations. The inverted 3D models can include resulting formation parameters for one or more pixels in the 3D model. For example, the inverted 3D model can include a resulting formation parameter of 10 ohm-m for the resistivity of a pixel. Inverting a transformed 3D model can be based on the type of constrained transformation used. For example, to invert an inversion variable to which a constrained nonlinear transformation was applied, the system can use a nonlinear transformation. For example, if the system used the nonlinear equation shown in Equation 34 to apply a constrained transformation to the inversion variable of an initial 3D model, the system can use the linear equation shown in Equation 35 to invert the inversion variable when generating the corresponding inverted 3D model. Alternatively, to invert an inversion variable to which a constrained linear transformation was applied, the system can apply a linear transformation to invert the transformed 3D model. For example, if the system used the linear equation shown in Equation 29 to apply a constrained transformation to the inversion variable of an initial 3D model, the system can use the linear equation shown in Equation 32 to invert the inversion variable when generating the corresponding inverted 3D model. In some embodiments, both linear and nonlinear transformations can be applied to the inversion variables of a transformed 3D model to generate an inverted 3D model.

At block 236, the system can generate a set of quality indicator values based on the inverted 3D models. In some embodiments, applying the constrained transformation and nonlinear minimization operations described above for a plurality of initial 3D models can result in multiple values for a same type of formation parameter for a same portion of a 3D model, wherein the portion can be a pixel, a set of pixels, or the entire 3D model. For example, different nonlinear transformation results can provide different resistivity values for the same pixel. In some embodiments, the quality indicator can indicate an accuracy and/or precision of a predicted formation parameter. In some embodiments, the quality indicator can be determined from a standard deviation (SD) and/or relative error (RE) calculation based on the multiple values for a same type of formation parameter for some or all of the pixels. Equation 60 represents a calculation the system can use to determine a RE value, wherein $\rho_i$ is a parameter of interest for an i-th element, $\bar{\rho}$ is the average value for the parameter of interest, and N is the total number of elements:

$$RE = \frac{1}{N}\sum_{i=1}^{N}\left|\frac{\rho_i - \bar{\rho}}{\bar{\rho}}\right|, \bar{\rho} = \frac{1}{N}\sum_{i=1}^{N}\rho_i \text{ or } \left(\bar{\rho} = \left(\prod_{i=1}^{N}\rho_i\right)^{\frac{1}{N}}\right) \quad (60)$$

The system can provide the quality indicator values based on the RE. For example, the system can use a relationship represented by Equations 61 and 62, wherein Equation 61 corresponds with 1.0 as representing no error and Equation 62 corresponds with 100 as representing no error, and wherein w(Rt) is weighting factor and QI2 represents a quality indicator value:

$$QI = w(Rt)[1.0 - \min(RE, 1.0)] \quad (61)$$

$$QI2 = w(Rt)[100 - \min(RE, 100)] \quad (62)$$

In some embodiments, the quality indicator QI2 can be a function of an intermediate quality indicator QI1, shown in Equation 63, wherein misfit represents a misfit error. For example, the relationship between QI2 and QI1 can be as shown in Equation 64:

$$QI1 = [1 - \min(\text{misfit}, 1.0)] \quad (63)$$

$$QI2 = QI1 * [100 - \min(RE, 100)] = \quad (64)$$
$$[1 - \min(\text{misfit}, 1.0)] * [100 - \min(RE, 100)]$$

At block 240, the system determines formation parameters based on the inverted 3D models. In some embodiments, the result provided by the inverted 3D models include a set of values that can be used directly as the formation parameters. For example, the average horizontal resistivity for a portion of a formation can be calculated form the average of the horizontal resistivity values corresponding to the pixel included in the portion of the formation. Alternatively, or in addition, formation parameters can be calculated from available formation parameters determined in the 3D model. For example, the system can implement a method following Archie's equation (shown in Equation 65), wherein SW is a water saturation, a and m are empirical constants, $R_w$ is a resistivity of connate water in pore spaces of the formation, $R_t$ is a formation resistivity:

$$S_w^n = \frac{aR_w}{R_t \varphi^m} \quad (65)$$

In some embodiments, Equation 64 can be modified by setting the variables m and n to be equal to 2 and the variable a to be equal to 1 in order to reduce Equation 64 to Equations 65 and 66. Equation 65 can be used to determine a 3D porosity-saturation index $S_w * \varphi$, and Equation 66 can be used to determine a 3D saturation value SW (in the case of a known porosity value):

$$S_w * \varphi = \left(\frac{R_w}{R_t}\right)^{\frac{1}{2}} \quad (66)$$

$$S_w = \frac{1}{\varphi}\left(\frac{R_w}{R_t}\right)^{\frac{1}{2}} \quad (67)$$

At block 250, the system modifies a well operation based on the resulting formation parameters. In some embodiments, the resulting formation parameters are correlated with a formation feature. For example, a set of resistivity values paired with a set of density values can be correlated with hydrocarbon-rich region the subsurface formation. In response, a drilling direction can be changed to a new direction target the hydrocarbon-rich region and drill a borehole in the new direction. As another example, a set of resistivity values in the inverted 3D model can be correlated to a water-rich region. In response, drilling direction can be changed or drilling speed can be stopped/slowed to avoid the water-rich region.

Example Results

Figure 3:
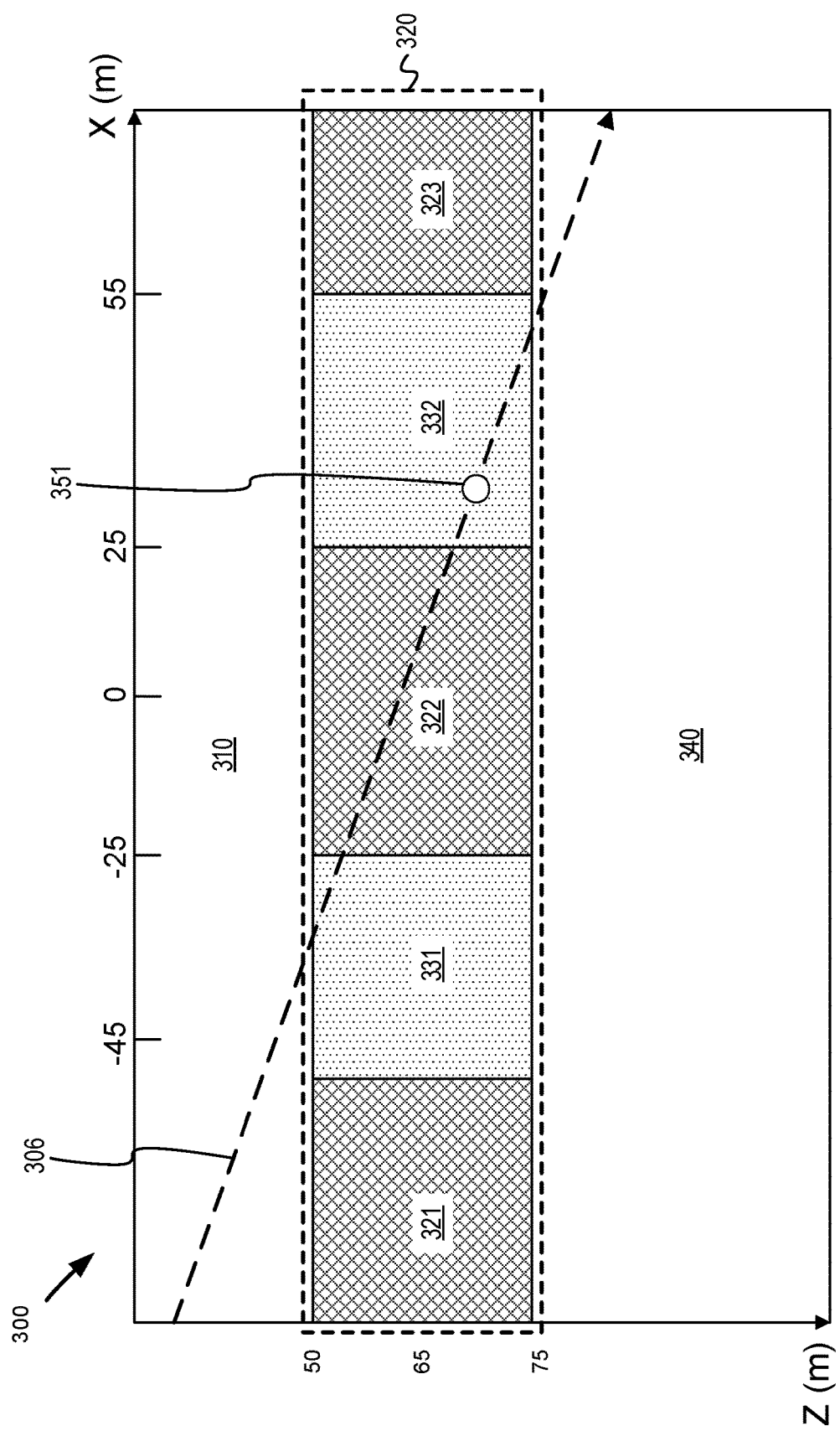
FIG. 3 is a cross-sectional view of a formation at a first plane.

FIG. 3 is a cross-sectional view of a formation at a first plane The cross-sectional view of the formation 300 shows a top formation layer 310, a middle formation layer 320 below the top formation layer 310, and a lower formation layer 340 below the middle formation layer 320. Each of the formation layers can have different formation parameter values from each other. The top formation layer 310 can be a homogeneous formation layer having a resistivity of 5 ohm-m. The middle formation layer 320 can be an inhomogeneous formation layer including three rock sections 321-323 and two water sections 331-332 in an alternating horizontal arrangement along the middle formation layer 320. The lower formation layer 340 can also have a resistivity of 5 ohm-m. In addition, the formation 300 has a well path 306 that penetrates each of the top formation layer 310, the middle formation layer 320, and the lower formation layer 340, wherein the well path 306 is shown at a 10 degree angle. While the well path 306 is shown at a 10 degree angle in FIG. 3, the well path 306 can be in any other direction.

Each of the layers can also include distinct sections having their own resistivity values. For example, the three rock sections 321-323 have a resistivity of 50 ohm-m and the two water sections 331-332 have a resistivity of 0.5 ohm-m. In a real or simulated environment, measurements from the sensors in the well path 306 can provide sensor measurements such as EM measurements and acoustic measurements. For example, a sensor at the sensor position 351 in the well path 306 can be used to provide EM measurements.

Figure 4:
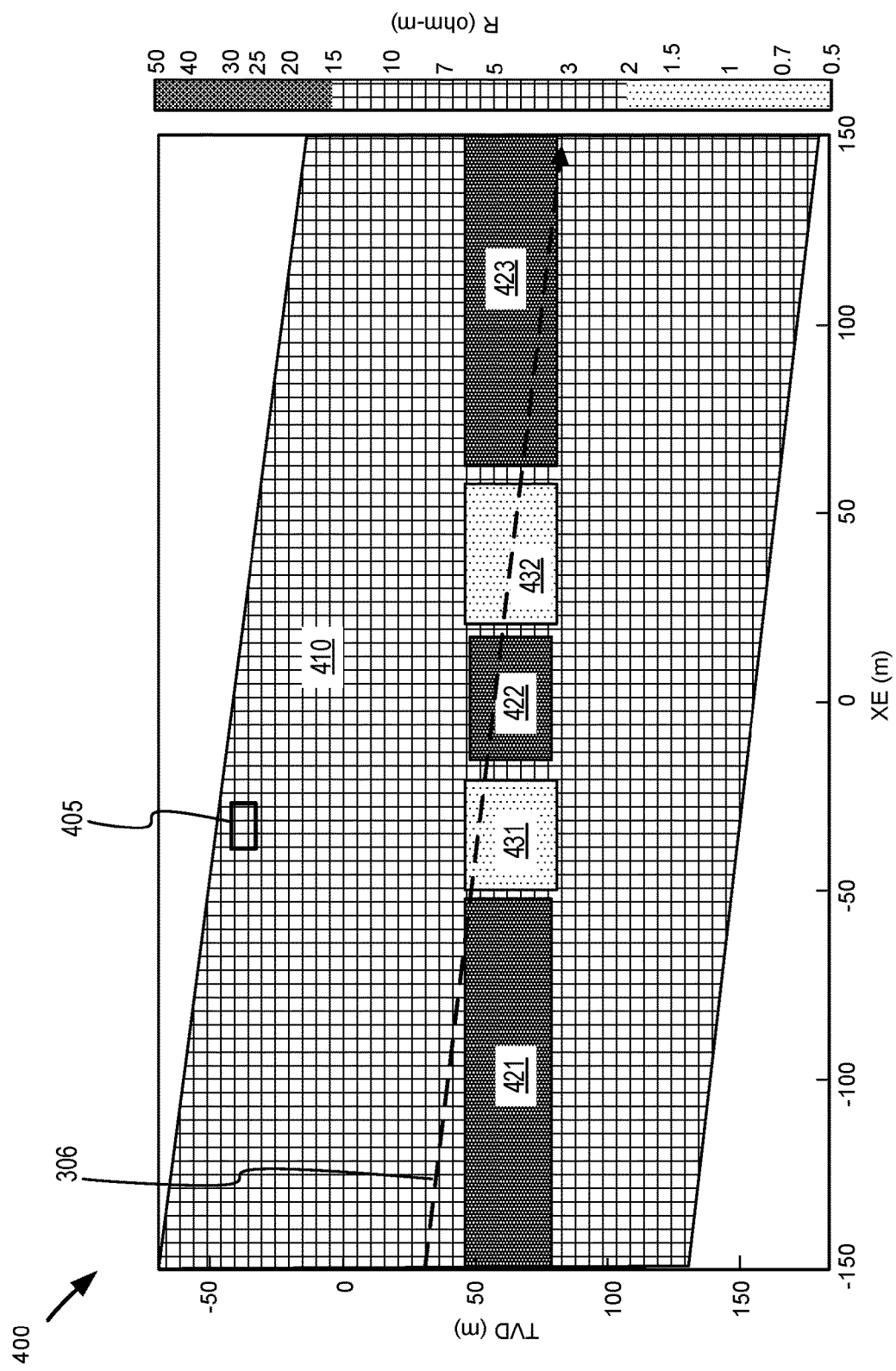
FIG. 4 is a cross-sectional view of a first 3D model generated using a constrained transformation that shows the resistivity of the formation at the first plane of the formation.

FIG. 4 is a cross-sectional view of a first 3D model generated using a constrained transformation that shows the resistivity of the formation at the first plane of the formation. FIG. 4 includes a 2D resistivity plot 400 that is based on an inverted 3D model, wherein the inverted 3D model can be generated using the operations described in the flowchart 200 of FIG. 2. The formation resistivity shown in the plot region 410 can be similar to the formation resistivity shown in the top formation layer 310 and the lower formation layer 340. The 2D resistivity plot 400 includes regions having various resistivity values and the same well path 306 shown in FIG. 3. In addition, the 2D resistivity plot 400 includes a boxed region 405, which will be used for comparison with the same boxed region 405 shown in a 2D resistivity plot 500 in FIG. 5 below.

The 2D resistivity plot 400 includes a set of high-resistivity regions 421-423, wherein each of the high-resistivity regions can be associated with a resistivity greater than 15 ohm-m (e.g. 50 ohm-m). The 2D resistivity plot 400 also includes a low-resistivity region 431 at the same depth as and between the high-resistivity regions 421 and 422, wherein the low-resistivity region 431 has a resistivity less than 2 ohm-m (e.g. 0.5 ohm-m). With reference to FIG. 3, the high-resistivity region 421 can correspond with the rock section 321, the high-resistivity region 422 can correspond with the rock section 322, and the high-resistivity region 423 can correspond with the rock section 323. In addition, the low-resistivity region 431 can correspond with the water section 331 and the low-resistivity region 432 can correspond with the water section 332. In addition, the angle of the well path 306 and sensors in the well path 306 do not inhibit the operations described above from generating an accurate inverted 3D model. For example, neither the high-resistivity regions 421-423 or the low-resistivity regions 431-432 are at the same tilt as the well path 306.

Figure 5:
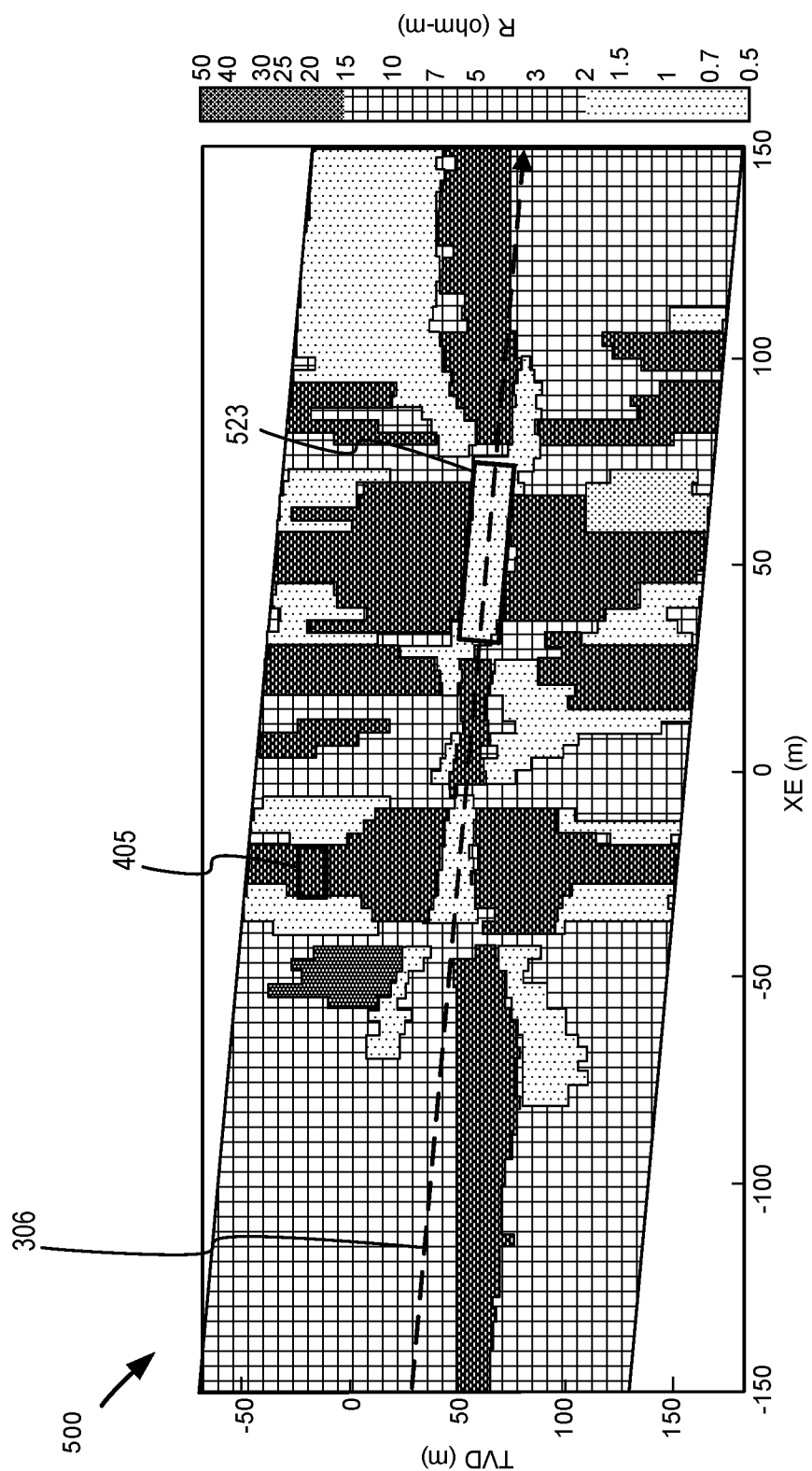
FIG. 5 is a cross-sectional view of a second 3D model generated using a 1D solver that shows the resistivity of the formation at the first plane of the formation.

FIG. 5 is a cross-sectional view of a second 3D model generated using a 1D solver that shows the resistivity of the formation at the first plane of the formation. A system can use a 1D solver such as a 1D forward modeling operation on the same formation 300 shown in FIG. 3 to generate a 2D resistivity plot 500. The 2D resistivity plot 500 can be a 2D view of an inverted 3D model using a 1D solver using measurements from the same well path 306. With reference to FIG. 4, a comparison between the low-resistivity region 432 and the low-resistivity region 532 show that predictions for formation parameters at regions close to the well path 306 can be accurate. However, formation parameter predictions for regions further away from the well path can be significantly more accurate when using the operations similar to or the same as those disclosed in the flowchart 200 of FIG. 2. For example, with further reference to FIG. 4 whereas the plot correctly shows the boxed region 405 having a resistivity less than 15 ohm-m (e.g. 10 ohm-m) in the 2D resistivity plot 400, the same boxed region 405 can be shown having a resistivity greater than 15 ohm-m (e.g. 30 ohm-m) in the 2D resistivity plot 500. Moreover, unlike the 3D model described in FIG. 4, the 1D solver generates formation parameter predictions that shown to form a path that is semi-parallel to the well path 306.

Figure 6:
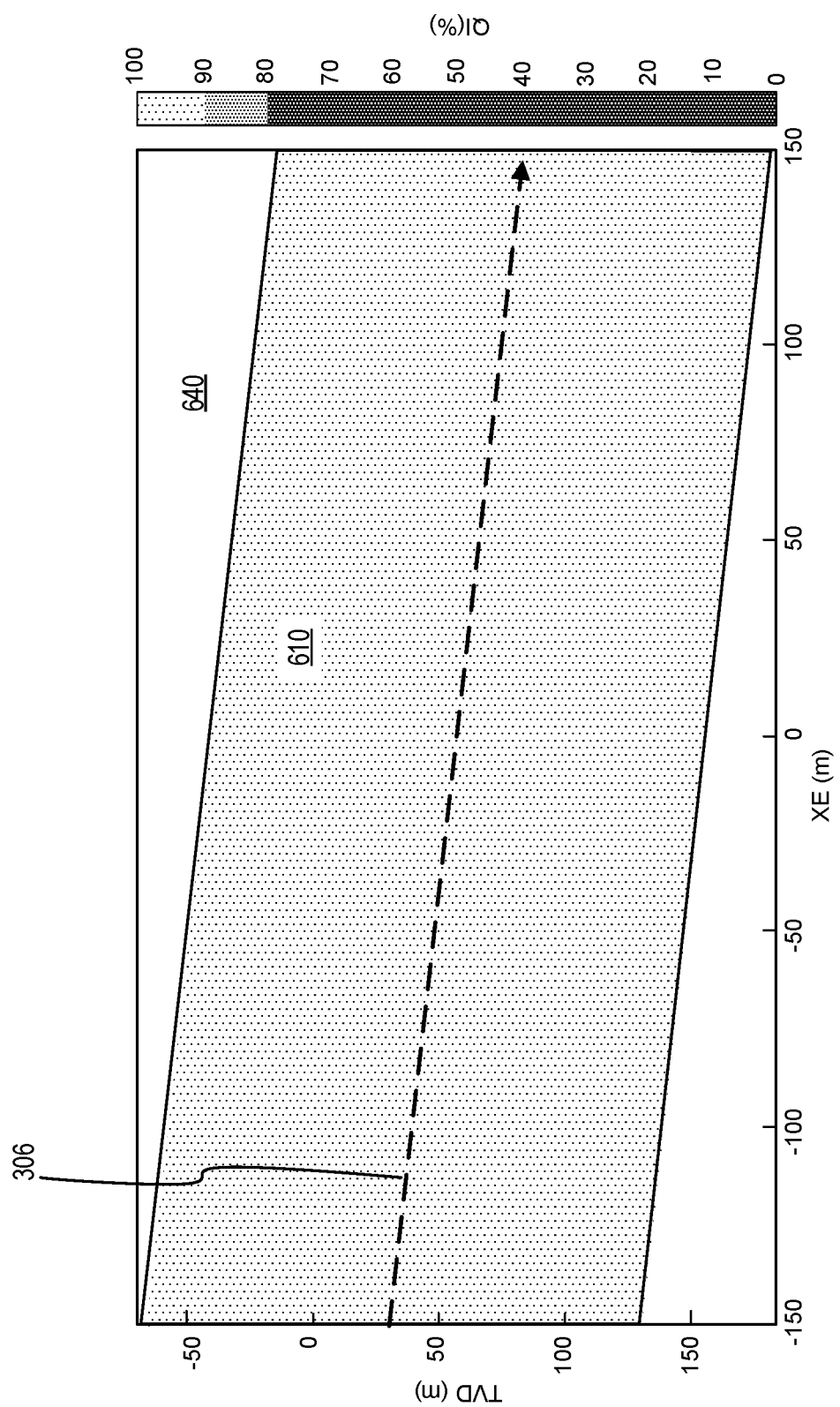
FIG. 6 is a cross-sectional view of a set of quality indicators for a 3D model of the formation at the first plane having no errors.

FIG. 6 is a cross-sectional view of a set of quality indicators for a 3D model of the formation at the first plane having no errors. As shown in the region 610, when the errors in an area or volume of the 3D model are actually zero or artificially set to zero, the quality indicator values corresponding to a measurable area or volume to indicate no error. Furthermore, the quality indicator values at a non-measured region 640 can be left blank or otherwise indicate that no quality indicator value is generated for the non-measured region 640. In some embodiments, this can be indicated with a quantitative value such as 1.0 or 100%. In some embodiments, the quality indicator can indicate a category or boolean value. For example, the quality indicator can indicate that the system calculated the formation parameters corresponding to a pixel with a confidence interval greater than 95%, 50%, or even 5%. Visually, the quality indicator can be indicated using one or more colors, patterns, transparent overlays, numbers, text, and/or some combination thereof.

Figure 7:
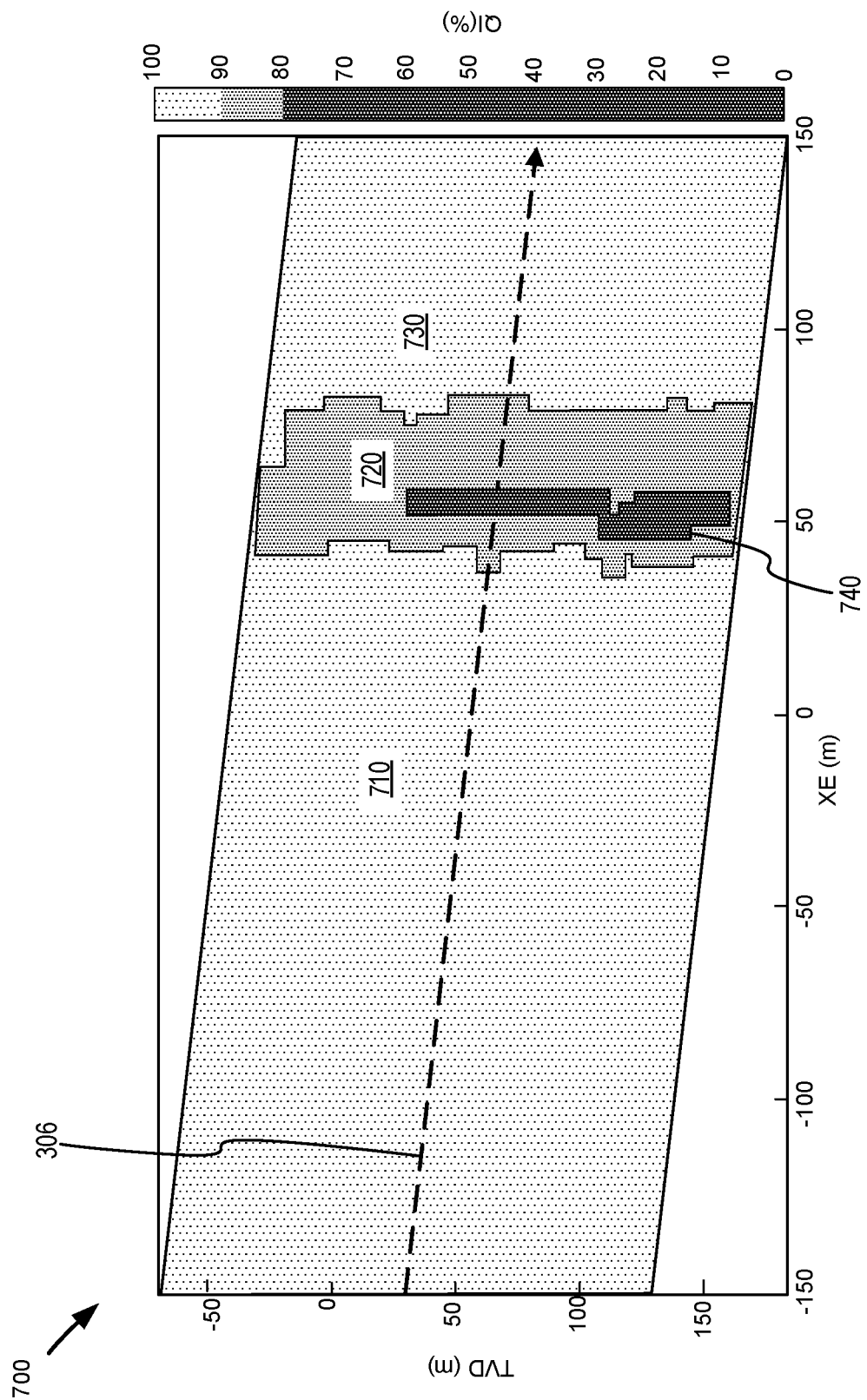
FIG. 7 is a cross-sectional view of a set of quality indicators for a 3D model of the formation at the first plane having some error.

FIG. 7 is a cross-sectional view of a set of quality indicators for a 3D model of the formation at the first plane having some error. The quality indicator plot 700 includes a first region 710 and third region 730, wherein the quality indicator values in the first region 710 and third region 730 show confidence values greater than 90%. The quality indicator plot 700 also includes a second region 720 between the first region 710 and the third region 730, wherein the confidence values in the second region 720 are less than 90%. The quality indicator plot 700 also includes a fourth region 740 within the second region 720, wherein the confidence values in the fourth region 740 are less than 80%. In some embodiments, the quality indicator values can be based on a relative error and/or standard deviation using operations similar to or the same as those described for block 236 in FIG. 2 above.

Figure 8:
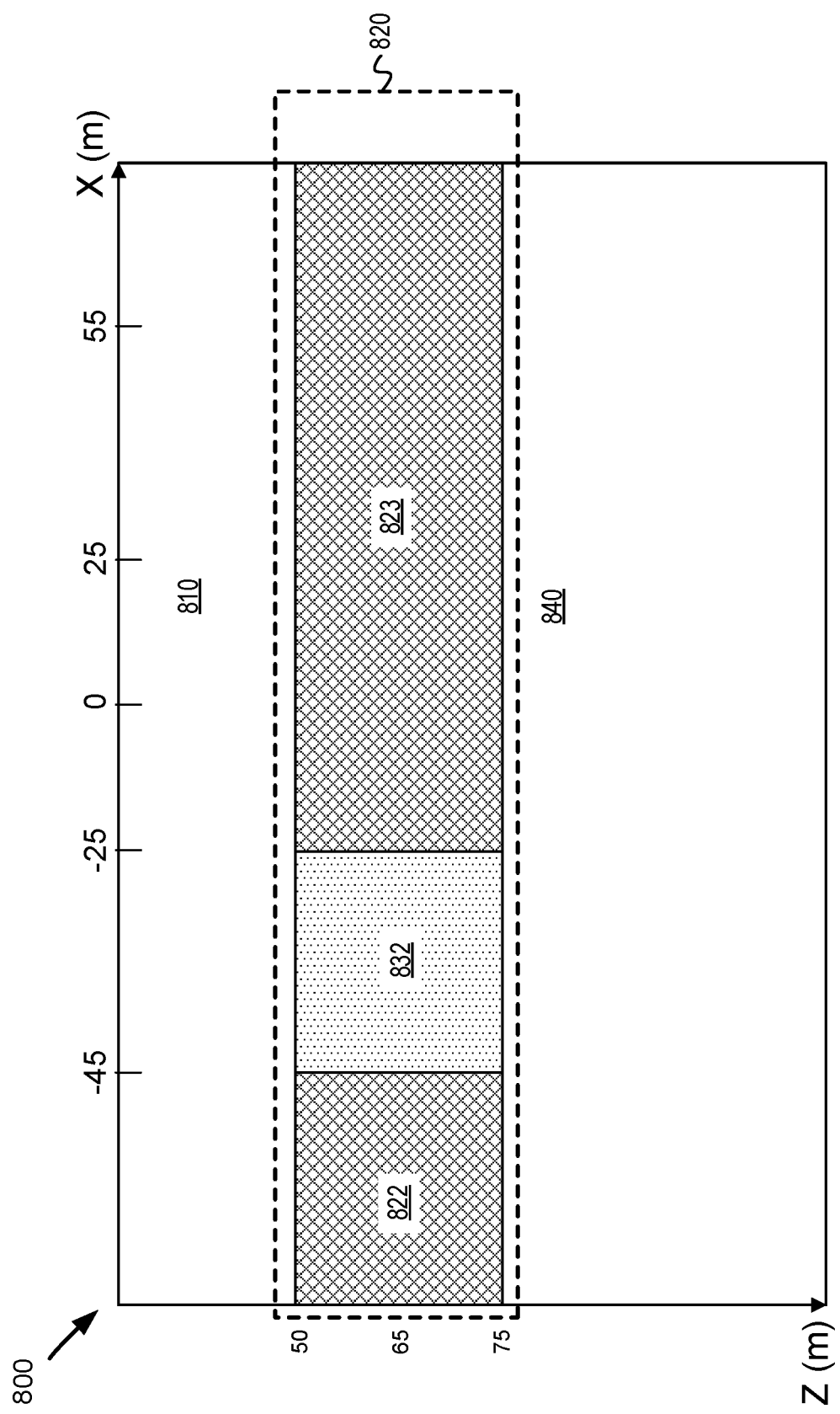
FIG. 8 is a cross-sectional view of a formation at a second plane.

FIG. 8 is a cross-sectional view of a formation at a second plane. The cross-sectional view of a formation 800 shows a top formation layer 810, a middle formation layer 820 below the top formation layer 810, and a lower formation layer 840 below the middle formation layer 820. Each of the formation layers can have different formation parameter values from each other. The top formation layer 810 can be a homogeneous formation layer having a resistivity of 5 ohm-m. The middle formation layer 820 can be an inhomogeneous formation layer including two rock sections 821-822 and a water section 831 in an alternating horizontal arrangement along the middle formation layer 820. The lower formation layer 840 can also have a resistivity of 5 ohm-m. Each of the layers can also include distinct portions having their own resistivity values. For example, the two rock sections 821-822 can have a resistivity of 50 ohm-m and the water section 831 can have a resistivity of 0.5 ohm-m.

Figure 9:
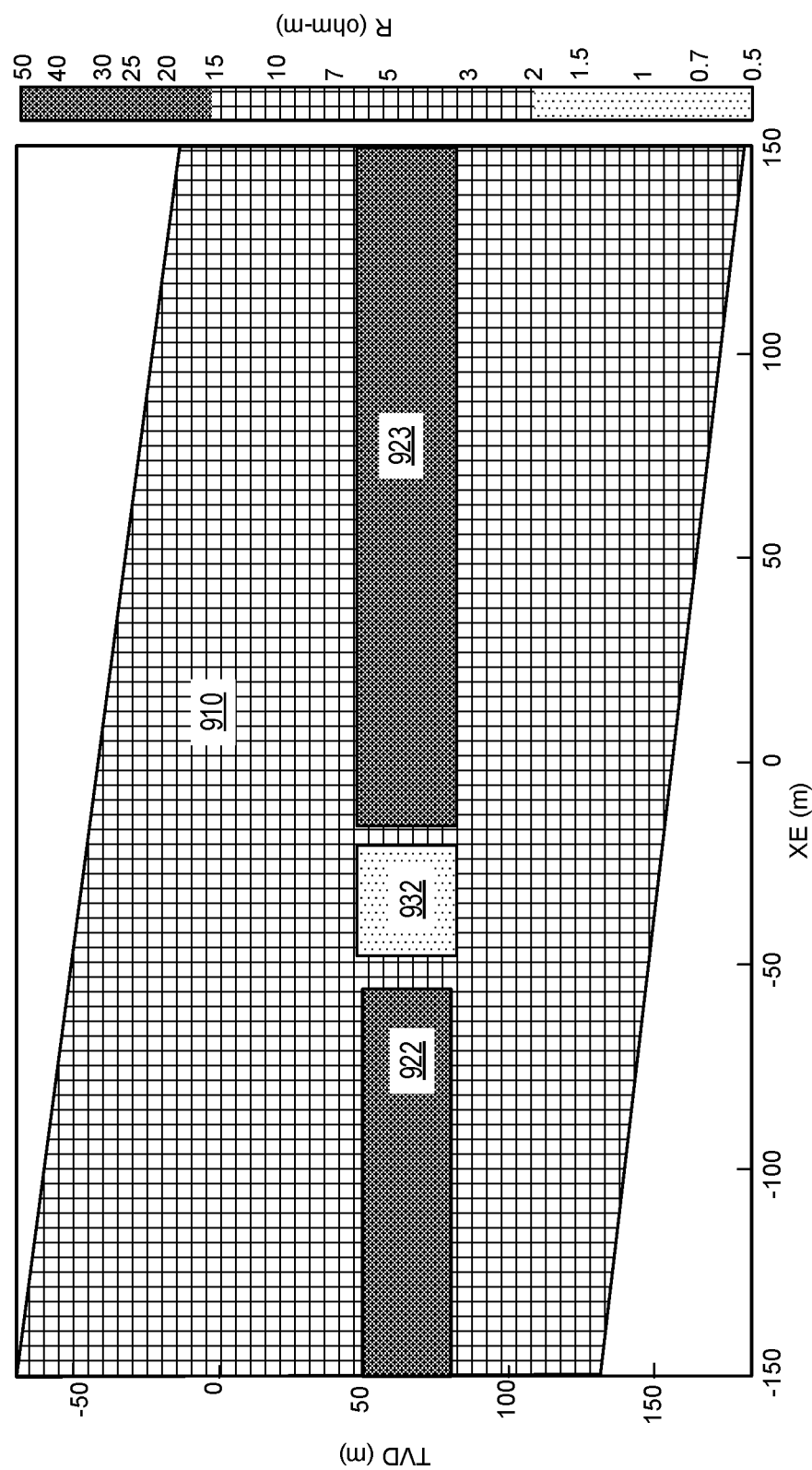
FIG. 9 is a cross-sectional view of a third 3D model generated using a constrained transformation that shows the resistivity of the formation at the second plane of the formation.

FIG. 9 is a cross-sectional view of a third 3D model generated using a constrained transformation that shows the resistivity of the formation at the second plane of the formation. FIG. 9 includes a 2D resistivity plot 900 generated based on an inverted 3D model, wherein the inverted 3D model can be generated from the formation 800 using operations from the flowchart 200 in FIG. 2. The formation resistivity shown in the plot region 910 accurately represents the formation resistivity shown in the top formation layer 810 and the lower formation layer 840 as between 3 ohms-m and 15 ohms-m. Each of the high-resistivity regions 922-923 can be associated with a resistivity greater than 15 ohm-m (e.g. 50 ohm-m). With reference to FIG. 3, the high-resistivity region 922 can correspond with the rock section 822, the high-resistivity region 923 can correspond with the rock section 823, and the water sections 831-832 have a resistivity less than 2 ohm-m (e.g. 0.5 ohm-m).

Figure 10:
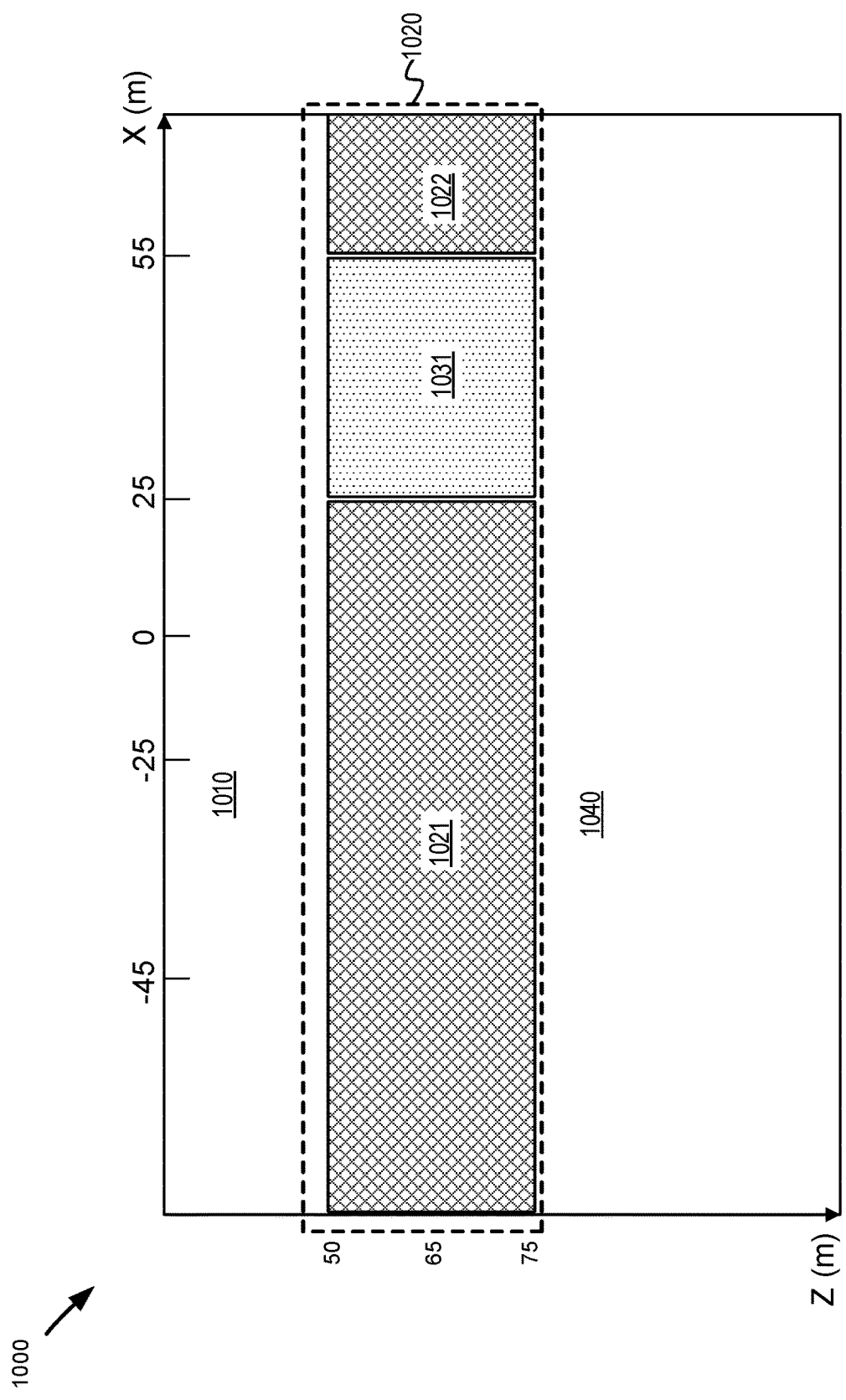
FIG. 10 is a cross-sectional view of a formation at a third plane.

FIG. 10 is a cross-sectional view of a formation at a third plane. The cross-sectional view of a formation 1000 shows a top formation layer 1010, a middle formation layer 1020 below the top formation layer 1010, and a lower formation layer 1040 below the middle formation layer 1020. Each of the formation layers can have different formation parameter values from each other. The top formation layer 1010 can be a homogeneous formation layer having a resistivity of 5 ohm-m. The middle formation layer 1020 can be an inhomogeneous formation layer including two rock sections 1021-1022 and a water section 1031 in an alternating horizontal arrangement along the middle formation layer 1020. The lower formation layer 1040 can also have a resistivity of 5 ohm-m. Each of the layers can also include distinct portions having their own resistivity values. For example, the two rock sections 1021-1022 can have a resistivity of 50 ohm-m and the water section 1031 can have a resistivity of 0.5 ohm-m.

Figure 11:
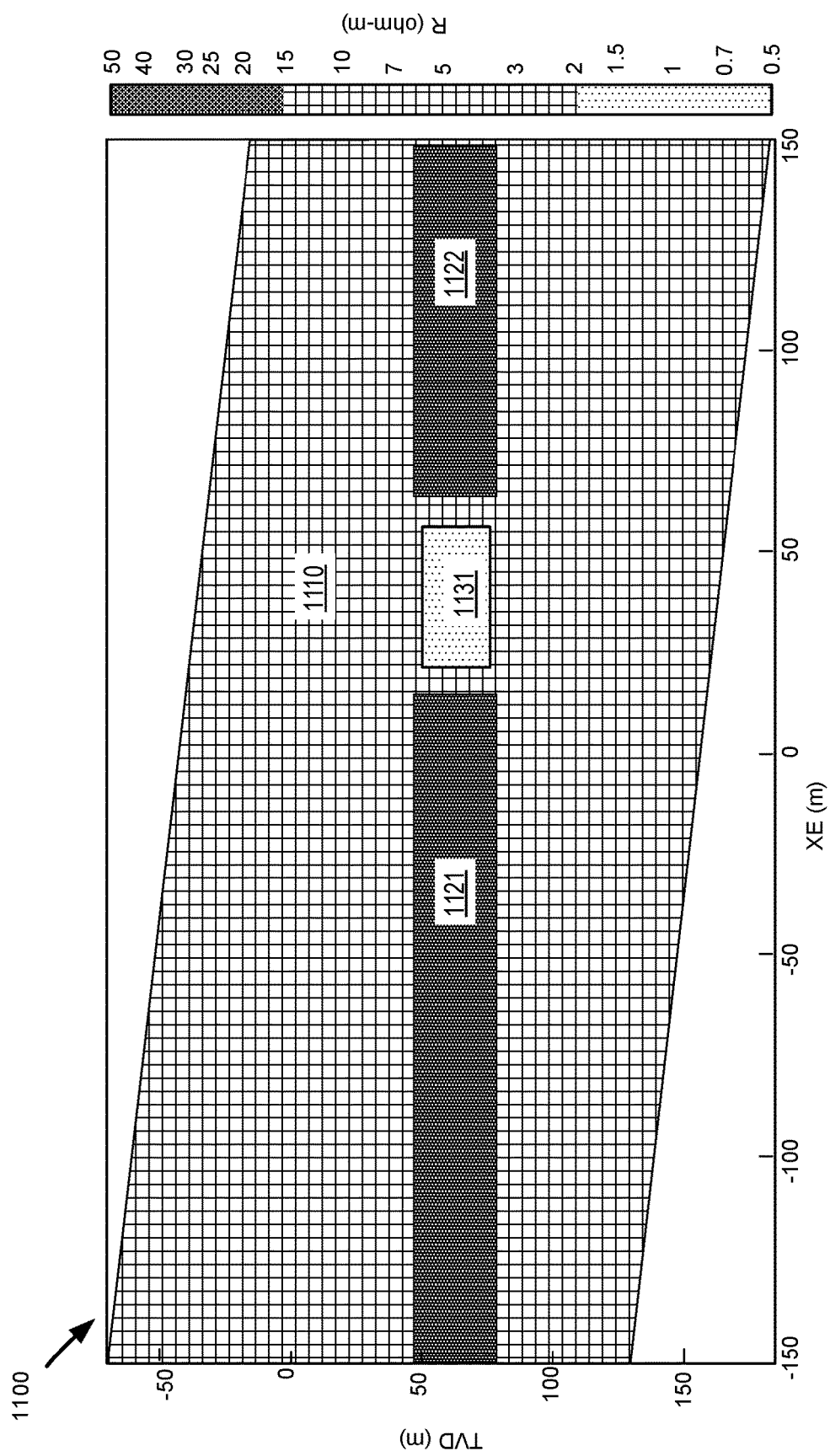
FIG. 11 is a cross-sectional view of a fourth 3D model generated using a constrained transformation that shows the resistivity of the formation at the first plane of the formation.

FIG. 11 is a cross-sectional view of a fourth 3D model generated using a constrained transformation that shows the resistivity of the formation at the first plane of the formation. FIG. 11 includes a 2D resistivity plot 1100 generated based on an inverted 3D model, wherein the inverted 3D model can be generated based on the formation 1000 of FIG. 10 using the flowchart 200 in FIG. 2. The formation resistivity shown in the plot region 1110 can be similar to the formation resistivity shown in the top formation layer 1010 and the lower formation layer 1040. The 2D resistivity plot 1100 includes a set of high-resistivity regions 1121-1122, wherein each of the high-resistivity regions can be associated with a resistivity greater than 15 ohm-m (e.g. 50 ohm-m). The 2D resistivity plot 1100 also includes a low-resistivity region 1131 at the same depth as and between the high-resistivity regions 1121 and 1122, wherein the low resistivity section has a resistivity less than 2 ohm-m (e.g. 0.5 ohm-m). With reference to FIG. 10, the high-resistivity region 1121 can correspond with the rock section 1021, the high-resistivity region 1122 can correspond with the rock section 1022, and the low-resistivity region 1131 can correspond with the water section 1031.

Example Systems

Figure 12:
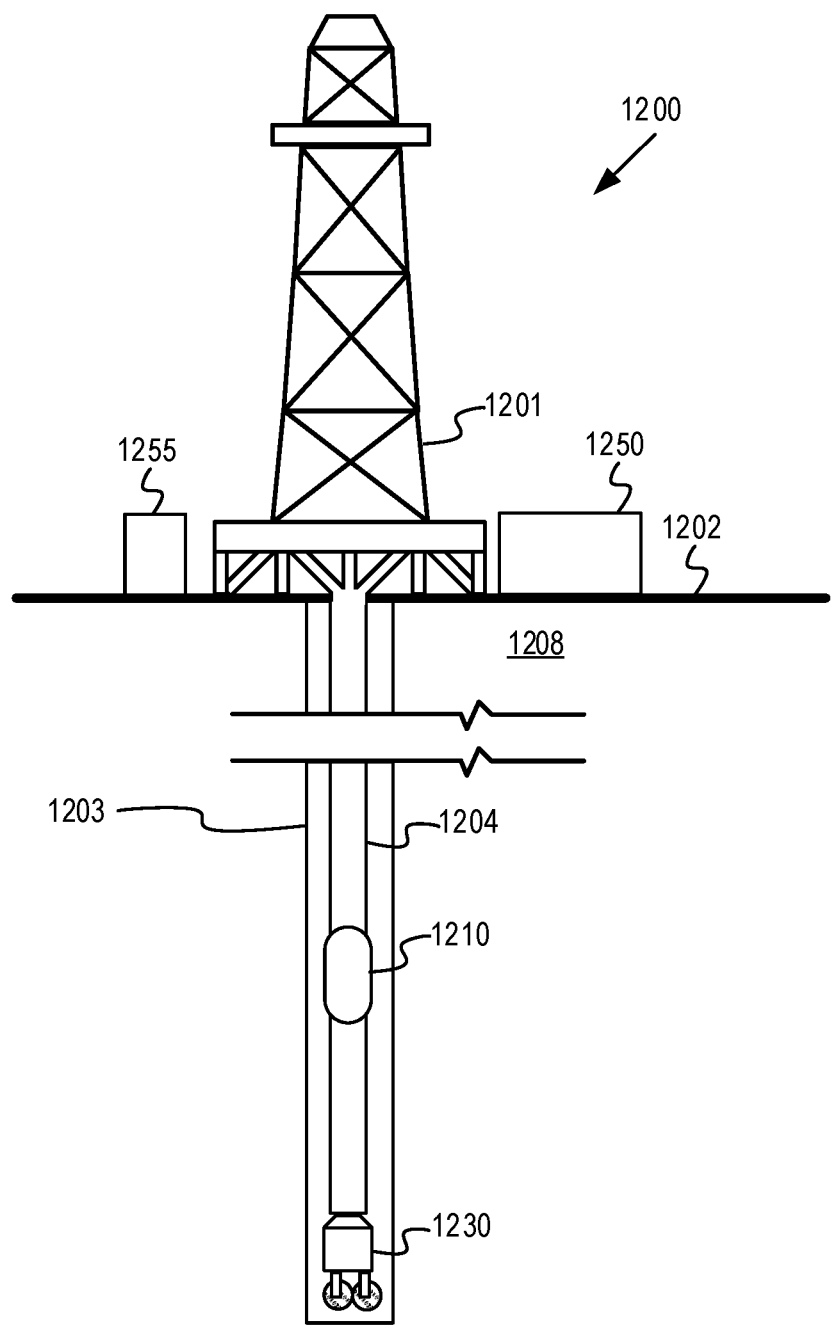
FIG. 12 is an elevation view of an onshore platform operating a downhole drilling assembly that includes a sensor to measure values for a first formation parameter.

FIG. 12 is an elevation view of an onshore platform operating a downhole drilling assembly that includes a sensor to measure values for a first formation parameter In FIG. 12, a drilling system 1200 includes a drilling rig 1201 located at the surface 1202 of a borehole 1203. The drilling system 1200 also includes a pump 1250 that can be operated to pump mud through a drill string 1204. The drill string 1204 can be operated for drilling the borehole 1203 through the subsurface formation 1208 using the drill bit 1230.

The drilling system 1200 includes a sensor tool 1210 to acquire sensor channel measurements from fluid and fluid mixtures in the borehole, such as a pure formation fluid, a pure drilling fluid, a mixture of formation fluid and drilling fluid, etc. The sensor tool 1210 can be part of the drill string 1204 and lowered into the borehole, optionally as part of a bottomhole assembly. The sensor tool 1210 can include a set of EM sensors that can emit an EM signal and/or receive an EM signal from the subsurface formation 1208. Alternatively, or in addition, the sensor tool 1210 can include optical sensors, resistivity sensors, viscosity sensors, density sensors, pressure sensors, etc. For example, the sensor tool 1210 can include an optical sensor that detects pressure measurements as the sensor tool 1210 is lowered into the formation.

While or after the set of sensors acquire sensor measurements, the computer 1255 can use the sensor measurements to set the values of a set of first formation parameters based on the sensor measurements. The computer 1255 can also generate an initial 3D model based on the set of first formation parameters. The computer 1255 can also apply one or more constrained transformations on the inversion variable(s) of the formation parameters and generate a transformed 3D model. Moreover, in response to determining that a portion of a formation includes a target formation parameter corresponding with hydrocarbon presence such as including an elevated resistivity correlated with low density, drilling operations can be moved in the direction of the formation having the target formation parameter. Alternatively, in response to determining that a portion of formation corresponds with the presence of water, such as by determining that a portion of the formation has a low resistivity, drilling operations and/or the drill bit 1230 can be altered or stopped.

Figure 13:
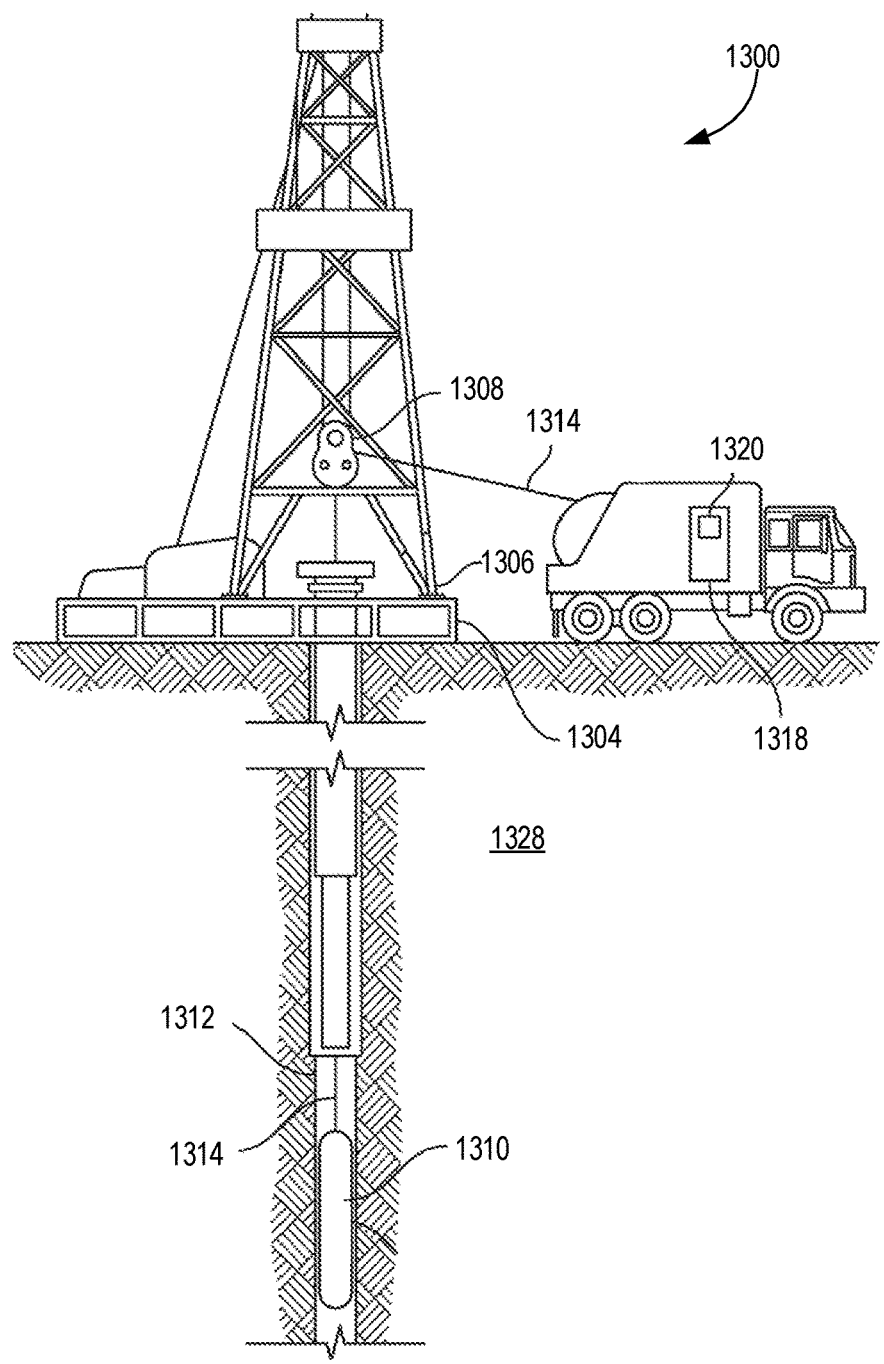
FIG. 13 is an elevation view of an onshore platform operating a wireline tool that that includes a sensor to measure values for a first formation parameter.

FIG. 13 is an elevation view of an onshore platform operating a wireline tool that that includes a sensor to measure values for a first formation parameter. The onshore platform 1300 comprises a drilling platform 1304 installed over a borehole 1312. The drilling platform 1304 is equipped with a derrick 1306 that supports a hoist 1308. The hoist 1308 supports the wireline tool 1310 via the conveyance 1314, wherein specific embodiments of the conveyance 1314 can be slickline, coiled tubing, piping, downhole tractor, or a combination thereof. The wireline tool 1310 can be lowered by the conveyance 1314 into the borehole 1312. Typically, the wireline tool 1310 is lowered to the bottom of the region of interest and subsequently pulled upward at a substantially constant speed.

The wireline tool 1310 is suspended in the borehole by a conveyance 1314 that connects the wireline tool 1310 to a surface system 1318 (which can also include a display 1320). In some embodiments, with reference to FIG. 12 above, the wireline tool 1310 can include one or more sensors analogous to the sensors described as included in the sensor tool 1210. The wireline tool 1310 can include a set of EM sensors that can emit an EM signal and/or receive an EM signal from the subsurface formation 1328. Alternatively, or in addition, the wireline tool 1310 can include optical sensors, resistivity sensors, viscosity sensors, density sensors, pressure sensors, etc. For example, the wireline tool 1310 can include an optical sensor that detects density measurements as the wireline tool 1310 is lowered into the subsurface formation 1328.

The sensor channel measurements can be communicated to a surface system 1318 via the conveyance 1314 for storage, processing, and analysis. The wireline tool 1310 can be deployed in the borehole 1312 on coiled tubing, jointed drill pipe, hard-wired drill pipe, or any other suitable deployment technique. In some embodiments, the conveyance 1314 can include sensors to acquire sensor measurements. The surface system 1318 can perform similarly to the computer 1255 in FIG. 1 and generate an initial 3D model, a variable-constrained 3D model, a transformed 3D model, etc. While described as being performed by the computer 1255 or the surface system 1318 at the surface, some or all of these operations can be performed downhole and/or at a location that is remote to a well location.

Example Computer

Figure 14:
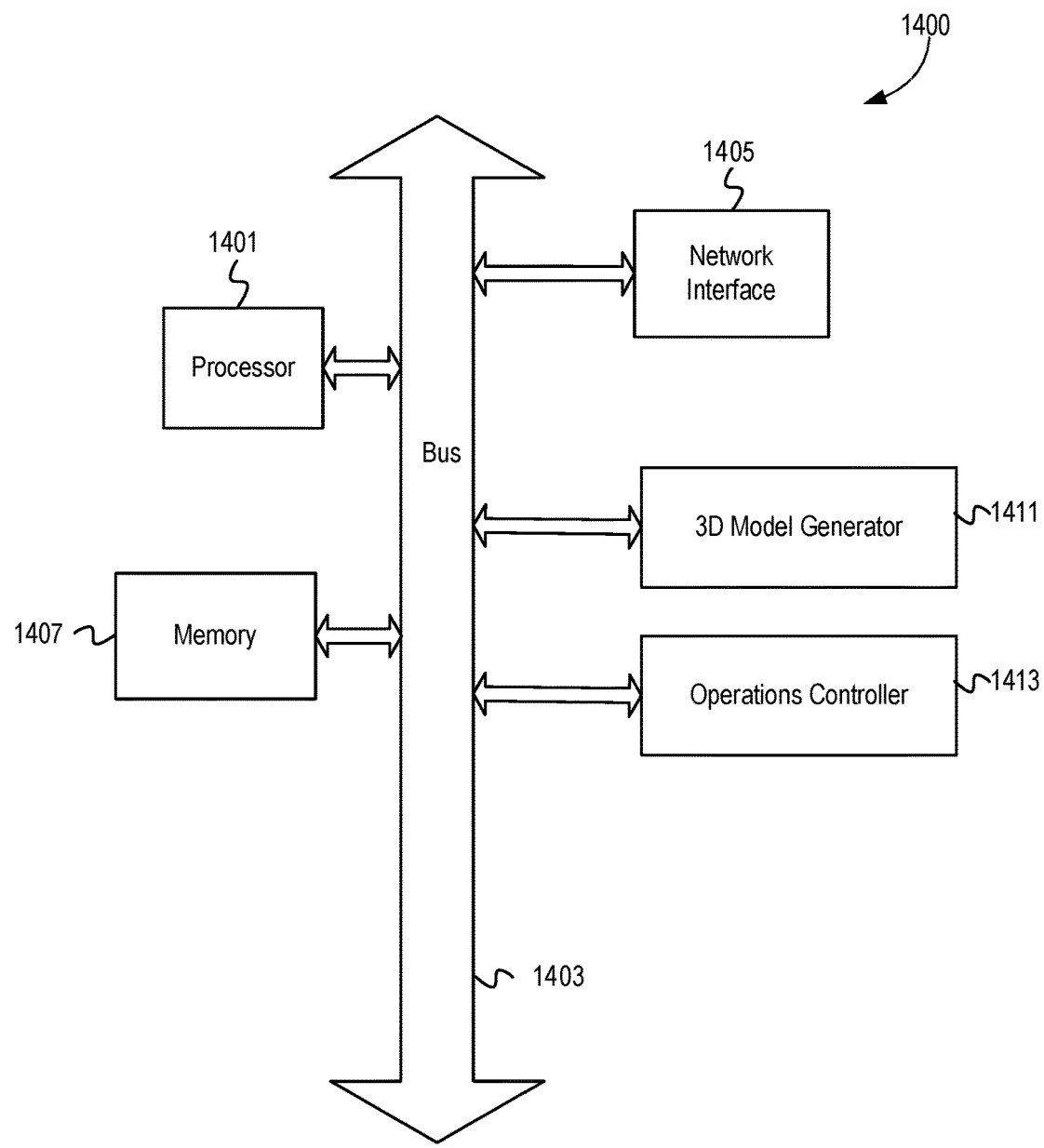
FIG. 14 depicts an example computer device.

FIG. 14 depicts an example computer device A computer device 1400 includes a processor 1401 (possibly including multiple processors, multiple cores, multiple nodes, and/or implementing multi-threading, etc.). The computer device 1400 includes a memory 1407. The memory 1407 can be system memory. For example, the memory 1407 can include one or more of cache, SRAM, DRAM, zero capacitor RAM, Twin Transistor RAM, eDRAM, EDO RAM, DDR RAM, EEPROM, NRAM, RRAM, SONOS, PRAM, etc. or any one or more of the above already described possible realizations of machine-readable media. The computer device 1400 also includes a bus 1403. For example, the bus 1403 can include a PCI, ISA, PCI-Express, HyperTransport® bus, InfiniBand® bus, NuBus, etc. The system can also include a network interface 1405. For example, the network interface 1405 can include a Fiber Channel interface, an Ethernet interface, an internet small computer system interface, SONET interface, wireless interface, etc.

The computer device 1400 includes a 3D model generator 1411 and an operations controller 1413. The 3D model generator 1411 can perform one or more operations described above. For example, the 3D model generator 1411 can apply a constrained transformation on one or more inversion variables of a 3D model and generate an inverted 3D model. The operations controller 1413 can control or otherwise modify drilling parameters or downhole operational parameters. For example, the operations controller 1413 can instruct a drill bit to stop rotating or change directions.

Any one of the previously described functionalities can be partially (or entirely) implemented in hardware and/or on the processor 1401. For example, the functionality can be implemented with an application specific integrated circuit, in logic implemented in the processor 1401, in a co-processor on a peripheral device or card, etc. Further, realizations can include fewer or additional components not illustrated in FIG. 14. For example, the computer device 1400 can include one or more video cards, audio cards, additional network interfaces, peripheral devices, etc. The processor 1401 and the network interface 1405 are coupled to the bus 1403. Although illustrated as being coupled to the bus 1403, the memory 1407 can be coupled to the processor 1401. The computer device 1400 can be a device at the surface and/or integrated into component(s) in the borehole.

As will be appreciated, aspects of the disclosure can be embodied as a system, method or program code/instructions stored in one or more machine-readable media. Aspects can take the form of hardware, software (including firmware, resident software, micro-code, etc.), or a combination of software and hardware aspects that can all generally be referred to herein as a "circuit" or "system." The functionality presented as individual units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

Additional Terminology and Variations

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. A set of items can have only one item or more than one item. As used herein, the term "or" is inclusive unless otherwise explicitly noted. Thus, the phrase "at least one of A, B, or C" is satisfied by any element from the set {A, B, C} or any combination thereof, including multiples of any element. Use of the phrase "a set of" followed by an element should not be treated as exclusive to a plurality of elements, unless specifically stated otherwise. A clause that recites "a set of items" can be referring to one item or a plurality of items.

EXAMPLE EMBODIMENTS

Example embodiments include the following:

Embodiment 1: A method comprising: setting a value of a formation parameter for a subsurface formation; creating an initial three-dimensional (3D) model of the subsurface formation based on the formation parameter; applying a constrained transformation to one or more inversion variables of the initial 3D model to create a variable-constrained 3D model of the subsurface formation; applying an unconstrained minimization operation to the variable-constrained 3D model to generate a first transformed 3D model; and inverting the first transformed 3D model to generate a first inverted 3D model of the subsurface formation.

Embodiment 2: The method of Embodiment 1, wherein applying the constrained transformation comprises applying a constrained nonlinear transformation.

Embodiment 3: The method of Embodiments 1 or 2, wherein the one or more inversion variables comprise at least one of a horizontal resistivity, a vertical resistivity, and an anisotropy of the subsurface formation.

Embodiment 4: The method of any of Embodiments 1-3, wherein the one or more inversion variables comprise at least one of a formation dip and an azimuth of the subsurface formation.

Embodiment 5: The method of any of Embodiments 1-4, wherein the one or more inversion variables comprise a boundary of a portion of the first inverted 3D model.

Embodiment 6: The method of any of Embodiments 1-5, further comprising drilling a borehole into the subsurface formation based on the first inverted 3D model.

Embodiment 7: The method of any of Embodiments 1-6, wherein the initial 3D model is a first initial 3D model, and wherein the method of claim 1 further comprises: generating a first lower-dimensional model, wherein the first lower-dimensional model is at least one of a one-dimensional (1D) model and a two-dimensional (2D) model of the subsurface formation based on the value of the formation parameter, wherein creating the first initial 3D model comprises using the first lower-dimensional model; generating a second lower-dimensional model, wherein the second lower-dimensional model is different from the first lower-dimensional model, and wherein the second lower-dimensional model is as at least one of the 1D model and the 2D model of the subsurface formation based on the value of the formation parameter; generating a second initial 3D model based on the second lower-dimensional model; generating a second transformed 3D model based the second initial 3D model using the unconstrained minimization operation; and inverting the second transformed 3D model to generate a second inverted 3D model of the subsurface formation.

Embodiment 8: The method of any of Embodiments 1-7, further comprises generating a quality indicator corresponding with a 3D portion of the first inverted 3D model, wherein the quality indicator is based on at least one of a standard deviation and relative error of the 3D portion.

Embodiment 9: The method of any of Embodiments 1-8, wherein the unconstrained minimization operation comprises using a Gauss-Newton algorithm.

Embodiment 10: The method of any of Embodiments 1-9, wherein the unconstrained minimization operation comprises using a Jacobian matrix, wherein the Jacobian matrix is generated using at least one of a finite difference method, an Adjoint method, a Broyden approximation, and a combination thereof.

Embodiment 11: A system to generate a first inverted 3D model of a subsurface formation, the system comprising: a processor; and a machine-readable medium having program code executable by the processor to cause the processor to, set a value of a formation parameter for the subsurface formation; create an initial three-dimensional (3D) model of the subsurface formation based on the formation parameter; apply a constrained transformation to one or more inversion variables of the initial 3D model to create a variable-constrained 3D model of the subsurface formation; apply an unconstrained minimization operation to the variable-constrained 3D model to generate a first transformed 3D model; and invert the first transformed 3D model to generate the first inverted 3D model of the subsurface formation.

Embodiment 12: The system of Embodiment 11, wherein the program code to apply the constrained transformation further comprises program code executable by the processor to cause the processor to apply a constrained nonlinear transformation.

Embodiment 13: The system of Embodiments 11 or 12, wherein the initial 3D model is a first initial 3D model, and wherein the machine-readable medium further comprises program code executable by the processor to cause the processor to: generate a first lower-dimensional model, wherein the first lower-dimensional model is at least one of a one-dimensional (1D) model and a two-dimensional (2D) model of the subsurface formation based on the value of the formation parameter, wherein creating the first initial 3D model comprises using the first lower-dimensional model; generate a second lower-dimensional model, wherein the second lower-dimensional model is different from the first lower-dimensional model, and wherein the second lower-dimensional model is as at least one of the 1D model and the 2D model of the subsurface formation based on the value of the formation parameter; generate a second initial 3D model based on the second lower-dimensional model; generate a second transformed 3D model based the second initial 3D model using the unconstrained minimization operation; and invert the second transformed 3D model to generate a second inverted 3D model of the subsurface formation.

Embodiment 14: The system of any of Embodiments 11-13, wherein the machine-readable medium further comprises program code executable by the processor to cause the processor to generate a quality indicator corresponding with a 3D portion of the first inverted 3D model, wherein the quality indicator is based on at least one of a standard deviation and relative error of the 3D portion.

Embodiment 15: The system of any of Embodiments 11-14, further comprising: a drill string in a borehole; and a drill bit attached to the drill string, wherein the machine-readable medium further comprises program code executable by the processor to: determine a second formation parameter based on the first inverted 3D model, and change a drilling direction or drilling speed based on the second formation parameter.

Embodiment 16: One or more non-transitory machine-readable media comprising program code to generate a first inverted 3D model of a subsurface formation, the program code to: set a value of a formation parameter for the subsurface formation; create an initial three-dimensional (3D) model of the subsurface formation based on the formation parameter; apply a constrained transformation to one or more inversion variables of the initial 3D model to create a variable-constrained 3D model of the subsurface formation; apply an unconstrained minimization operation to the variable-constrained 3D model to generate a first transformed 3D model; and invert the first transformed 3D model to generate the first inverted 3D model of the subsurface formation.

Embodiment 17: The one or more non-transitory machine-readable media of Embodiment 16, wherein the program code to apply the constrained transformation comprises program code to apply a constrained nonlinear transformation.

Embodiment 18: The one or more non-transitory machine-readable media of Embodiments 16 or 17, wherein the initial 3D model is a first initial 3D model, and wherein the machine-readable media further comprises program code to: generate a first lower-dimensional model, wherein the first lower-dimensional model is at least one of a one-dimensional (1D) model and a two-dimensional (2D) model of the subsurface formation based on the value of the formation parameter, wherein creating the first initial 3D model comprises using the first lower-dimensional model; generate a second lower-dimensional model, wherein the second lower-dimensional model is different from the first lower-dimensional model, and wherein the second lower-dimensional model is as at least one of the 1D model and the 2D model of the subsurface formation based on the value of the formation parameter; generate a second initial 3D model based on the second lower-dimensional model; generate a second transformed 3D model based the second initial 3D model using the unconstrained minimization operation; and invert the second transformed 3D model to generate a second inverted 3D model of the subsurface formation.

Embodiment 19: The one or more non-transitory machine-readable media of any of Embodiments 16-18, further comprising program code to generate a quality indicator corresponding with a 3D portion of the first inverted 3D model, wherein the quality indicator is based on at least one of a standard deviation and relative error of the 3D portion.

Embodiment 20: The one or more non-transitory machine-readable media of any of Embodiments 16-19, further comprising program code to drill a borehole into the subsurface formation based on the first inverted 3D model.

What is claimed is:

1. A method comprising:
    setting a value of a formation parameter for a subsurface formation;
    creating an initial three-dimensional (3D) model of the subsurface formation based on the formation parameter;
    applying a constrained transformation to one or more inversion variables of the initial 3D model to create a variable-constrained 3D model of the subsurface formation;
    applying an unconstrained minimization operation to the variable-constrained 3D model to generate a first transformed 3D model; and
    inverting the first transformed 3D model to generate a first inverted 3D model of the subsurface formation.

2. The method of claim 1, wherein applying the constrained transformation comprises applying a constrained nonlinear transformation.

3. The method of claim 1, wherein the one or more inversion variables comprise at least one of a horizontal resistivity, a vertical resistivity, and an anisotropy of the subsurface formation.

4. The method of claim 1, wherein the one or more inversion variables comprise at least one of a formation dip and an azimuth of the subsurface formation.

5. The method of claim 1, wherein the one or more inversion variables comprise a boundary of a portion of the first inverted 3D model.

6. The method of claim 1, further comprising drilling a borehole into the subsurface formation based on the first inverted 3D model.

7. The method of claim 1, wherein the initial 3D model is a first initial 3D model, and wherein the method of claim 1 further comprises:
    generating a first lower-dimensional model, wherein the first lower-dimensional model is at least one of a one-dimensional (1D) model and a two-dimensional (2D) model of the subsurface formation based on the value of the formation parameter, wherein creating the first initial 3D model comprises using the first lower-dimensional model;
    generating a second lower-dimensional model, wherein the second lower-dimensional model is different from the first lower-dimensional model, and wherein the second lower-dimensional model is as at least one of the 1D model and the 2D model of the subsurface formation based on the value of the formation parameter;
    generating a second initial 3D model based on the second lower-dimensional model;
    generating a second transformed 3D model based the second initial 3D model using the unconstrained minimization operation; and
    inverting the second transformed 3D model to generate a second inverted 3D model of the subsurface formation.

8. The method of claim 1, further comprises generating a quality indicator corresponding with a 3D portion of the first inverted 3D model, wherein the quality indicator is based on at least one of a standard deviation and relative error of the 3D portion.

9. The method of claim 1, wherein the unconstrained minimization operation comprises using a Gauss-Newton algorithm.

10. The method of claim 1, wherein the unconstrained minimization operation comprises using a Jacobian matrix, wherein the Jacobian matrix is generated using at least one of a finite difference method, an Adjoint method, a Broyden approximation, and a combination thereof.

11. A system to generate a first inverted 3D model of a subsurface formation, the system comprising:
    a processor; and
    a machine-readable medium having program code executable by the processor to cause the processor to,
        set a value of a formation parameter for the subsurface formation;
        create an initial three-dimensional (3D) model of the subsurface formation based on the formation parameter;
        apply a constrained transformation to one or more inversion variables of the initial 3D model to create a variable-constrained 3D model of the subsurface formation;
        apply an unconstrained minimization operation to the variable-constrained 3D model to generate a first transformed 3D model; and invert the first transformed 3D model to generate the first inverted 3D model of the subsurface formation.

12. The system of claim 11, wherein the program code to apply the constrained transformation further comprises program code executable by the processor to cause the processor to apply a constrained nonlinear transformation.

13. The system of claim 11, wherein the initial 3D model is a first initial 3D model, and wherein the machine-readable medium further comprises program code executable by the processor to cause the processor to:
generate a first lower-dimensional model, wherein the first lower-dimensional model is at least one of a one-dimensional (1D) model and a two-dimensional (2D) model of the subsurface formation based on the value of the formation parameter, wherein creating the first initial 3D model comprises using the first lower-dimensional model;
generate a second lower-dimensional model, wherein the second lower-dimensional model is different from the first lower-dimensional model, and wherein the second lower-dimensional model is as at least one of the 1D model and the 2D model of the subsurface formation based on the value of the formation parameter;
generate a second initial 3D model based on the second lower-dimensional model;
generate a second transformed 3D model based the second initial 3D model using the unconstrained minimization operation; and
invert the second transformed 3D model to generate a second inverted 3D model of the subsurface formation.

14. The system of claim 11, wherein the machine-readable medium further comprises program code executable by the processor to cause the processor to generate a quality indicator corresponding with a 3D portion of the first inverted 3D model, wherein the quality indicator is based on at least one of a standard deviation and relative error of the 3D portion.

15. The system of claim 11, further comprising:
a drill string in a borehole; and
a drill bit attached to the drill string, wherein the machine-readable medium further comprises program code executable by the processor to:
determine a second formation parameter based on the first inverted 3D model, and change a drilling direction or drilling speed based on the second formation parameter.

16. One or more non-transitory machine-readable media comprising program code to generate a first inverted 3D model of a subsurface formation, the program code to:
set a value of a formation parameter for the subsurface formation;
create an initial three-dimensional (3D) model of the subsurface formation based on the formation parameter;
apply a constrained transformation to one or more inversion variables of the initial 3D model to create a variable-constrained 3D model of the subsurface formation;
apply an unconstrained minimization operation to the variable-constrained 3D model to generate a first transformed 3D model; and
invert the first transformed 3D model to generate the first inverted 3D model of the subsurface formation.

17. The one or more non-transitory machine-readable media of claim 16, wherein the program code to apply the constrained transformation comprises program code to apply a constrained nonlinear transformation.

18. The one or more non-transitory machine-readable media of claim 16, wherein the initial 3D model is a first initial 3D model, and wherein the machine-readable media further comprises program code to:
generate a first lower-dimensional model, wherein the first lower-dimensional model is at least one of a one-dimensional (1D) model and a two-dimensional (2D) model of the subsurface formation based on the value of the formation parameter, wherein creating the first initial 3D model comprises using the first lower-dimensional model;
generate a second lower-dimensional model, wherein the second lower-dimensional model is different from the first lower-dimensional model, and wherein the second lower-dimensional model is as at least one of the 1D model and the 2D model of the subsurface formation based on the value of the formation parameter;
generate a second initial 3D model based on the second lower-dimensional model;
generate a second transformed 3D model based the second initial 3D model using the unconstrained minimization operation; and
invert the second transformed 3D model to generate a second inverted 3D model of the subsurface formation.

19. The one or more non-transitory machine-readable media of claim 16, further comprising program code to generate a quality indicator corresponding with a 3D portion of the first inverted 3D model, wherein the quality indicator is based on at least one of a standard deviation and relative error of the 3D portion.

20. The one or more non-transitory machine-readable media of claim 16, further comprising program code to drill a borehole into the subsurface formation based on the first inverted 3D model.

* * * * *